US010514755B2

(12) United States Patent
Cho et al.

(10) Patent No.: US 10,514,755 B2
(45) Date of Patent: Dec. 24, 2019

(54) GLASSES-TYPE TERMINAL AND CONTROL METHOD THEREFOR

(71) Applicant: LG ELECTRONICS INC., Seoul (KR)

(72) Inventors: Taehoon Cho, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 15/569,922

(22) PCT Filed: May 8, 2015

(86) PCT No.: PCT/KR2015/004579
§ 371 (c)(1),
(2) Date: Oct. 27, 2017

(87) PCT Pub. No.: WO2016/182090
PCT Pub. Date: Nov. 17, 2016

(65) Prior Publication Data
US 2018/0150133 A1 May 31, 2018

(51) Int. Cl.
*G06F 3/01* (2006.01)
*G06F 3/0481* (2013.01)
(Continued)

(52) U.S. Cl.
CPC ......... *G06F 3/013* (2013.01); *G02B 27/0093* (2013.01); *G02B 27/0172* (2013.01);
(Continued)

(58) Field of Classification Search
CPC .......... G06F 3/013; G06F 3/011; G06F 3/012; G06F 3/017; G06F 3/0481;
(Continued)

(56) References Cited

U.S. PATENT DOCUMENTS

2012/0194419 A1 * 8/2012 Osterhout .......... G02B 27/0093
345/156
2013/0114850 A1 5/2013 Publicover et al.
(Continued)

FOREIGN PATENT DOCUMENTS

KR 10-2013-0000401 A 1/2013
KR 10-2013-0059827 A 6/2013
(Continued)

*Primary Examiner* — Tom V Sheng
(74) *Attorney, Agent, or Firm* — Birch, Stewart, Kolasch & Birch, LLP

(57) ABSTRACT

According to one embodiment of the present disclosure, a glasses-type terminal can specify one external object on the basis of a user's eyes and perform a related function to the specified object. More particularly, the glasses-type terminal according to one embodiment of the present disclosure comprises: a display unit provided at a main body of the glasses-type terminal; a camera for photographing an external environment; a sensing unit for sensing the user's eyes with respect to the external environment; and a control unit analyzing the user's eyes with respect to the external environment so as to specify an object, which is the user's eyes are facing, from an image corresponding to the external environment, which is photographed by the camera, such a function icon is linked to a preset region that corresponds to a region in which the specified object is located, on the basis of an event related to the specified object through the camera.

13 Claims, 19 Drawing Sheets

(51) Int. Cl.
    G02B 27/01    (2006.01)
    G06F 3/0482   (2013.01)
    G06K 9/00     (2006.01)
    G02B 27/00    (2006.01)
    G06F 3/0484   (2013.01)
(52) U.S. Cl.
    CPC ............ G06F 3/011 (2013.01); G06F 3/0481 (2013.01); G06F 3/0482 (2013.01); G06F 3/04817 (2013.01); G06F 3/04842 (2013.01); G06K 9/00597 (2013.01); G06K 9/00671 (2013.01); *G02B 2027/0138* (2013.01); *G02B 2027/0178* (2013.01)
(58) Field of Classification Search
    CPC ............ G06F 3/04815; G06F 3/04817; G06F 3/0482; G06F 3/04842; G02B 27/0093; G02B 27/0172; G02B 2027/0138; G02B 2027/0178; G06K 9/00597; G06K 9/00671
    See application file for complete search history.

(56) References Cited

U.S. PATENT DOCUMENTS

| | | | |
|---|---|---|---|
| 2014/0237366 A1 | 8/2014 | Poulos et al. | |
| 2015/0042543 A1* | 2/2015 | Kim | G02B 27/017 345/8 |
| 2016/0018885 A1* | 1/2016 | Kimura | G06F 3/011 345/156 |
| 2016/0162020 A1* | 6/2016 | Lehman | G06F 3/013 715/835 |
| 2016/0378294 A1* | 12/2016 | Wright | G06F 3/04815 715/851 |
| 2017/0038837 A1* | 2/2017 | Faaborg | G06F 3/0482 |
| 2017/0060230 A1* | 3/2017 | Faaborg | G06F 3/011 |
| 2017/0287218 A1* | 10/2017 | Nuernberger | G06T 19/006 |
| 2017/0358141 A1* | 12/2017 | Stafford | G02B 27/017 |
| 2018/0074329 A1* | 3/2018 | Kazansky | G02B 27/0172 |
| 2018/0164983 A1* | 6/2018 | Torii | G02B 27/01 |
| 2018/0188807 A1* | 7/2018 | Cimenser | A61B 5/0022 |
| 2018/0286126 A1* | 10/2018 | Schwarz | G06F 3/011 |
| 2018/0321894 A1* | 11/2018 | Paulovich | G06F 3/1454 |

FOREIGN PATENT DOCUMENTS

| | | |
|---|---|---|
| KR | 10-2013-0067902 A | 6/2013 |
| KR | 10-2014-0072651 A | 6/2014 |
| KR | 10-2014-0128489 A | 11/2014 |
| KR | 10-2014-0139883 A | 12/2014 |
| KR | 10-2015-0033431 A | 4/2015 |

* cited by examiner

GLASSES-TYPE TERMINAL AND CONTROL METHOD THEREFOR

CROSS REFERENCE TO RELATED APPLICATIONS

This application is the National Phase of PCT/KR2015/004579 filed on May 8, 2015, which is hereby expressly incorporated by reference into the present application.

BACKGROUND OF THE DISCLOSURE

1. Field of the Disclosure

The present disclosure relates to a glasses-type terminal capable of performing various functions based on a user's gaze analysis.

2. Background of the Disclosure

Terminals may be divided into mobile/portable terminals and stationary terminals according to their mobility. Mobile terminals may also be divided into handheld terminals and vehicle mount terminals according to whether or not a user can directly carry the terminal.

As it becomes multifunctional, a mobile terminal can be allowed to capture still images or moving images, play music or video files, play games, receive broadcast and the like, so as to be implemented as an integrated multimedia player. Moreover, in order to support and enhance the functions of the terminal, the improvement of structural and software elements of the terminal may be taken into consideration.

In recent years, wearable glasses-type terminals formed to be mountable on a part of a human body have been developed. A glasses-type terminal mounted on a user's head may correspond to a head-mounted display (HMD). A display unit provided in a glasses-type terminal such as an HMD may be combined with augmented reality technology, N-screen technology and the like beyond a simple image output function to provide a variety of conveniences to the user.

In addition, research has been actively conducted on a control method using a user's gaze analysis with the use of the characteristics of the glasses-type terminal mounted on a head. For an example, there may be a simple function of tracking the user's gaze to specify or search for information.

On the other hand, when a certain function is executed for a specific person existing in the real world, for example, in order to perform a function of searching information of the specific person or sharing information with the specific person, there has been an inconvenience for the user to directly apply an input. In addition, there has been a limitation in executing various functions in relation to the specific person only by the user's gaze.

SUMMARY OF THE DISCLOSURE

Accordingly, a technical task of the present disclosure is to provide a control method capable of executing various functions associated with a specific object existing in the real world using a user's gaze analysis.

A glasses-type terminal according to an embodiment of the present disclosure may include a display unit provided on a main body of the glasses-type terminal, a camera configured to capture an external environment, a sensing unit configured to sense a user's gaze on the external environment, and a controller configured to analyze the user's gaze on the external environment to specify an object to which the user's gaze is directed from an image corresponding to the external environment captured by the camera, and control the display unit to locate a function icon linked to a preset function in a corresponding region that corresponds to a region in which the specified object is located based on an event associated with the specified object being captured through the camera.

According to an embodiment, the controller may execute a function linked to the function icon based on receiving a selection input associated with the function icon.

According to an embodiment, the selection input associated with the function icon may be received by sensing the user's preset gesture in a state where the user's gaze toward the function icon is sensed by the sensing unit.

According to an embodiment, an event associated with the specified object may be a preset movement of the specified object captured through the camera.

According to an embodiment, the mobile terminal may further include a wireless communication unit, wherein the function icon includes a control icon linked to a function of controlling an external device corresponding to the specified object, and the controller controls the wireless communication to transmit a preset control command to an external device when a function of controlling the external device corresponding to the specified object is carried out.

According to an embodiment, the controller may analyze an image of the specified object included in an image corresponding to the external environment to acquire the identification information of the external device corresponding to the specified object, and control the wireless communication unit to perform wireless communication with the external device using the identification information of the external device.

According to an embodiment, the controller may control the wireless communication unit to transmit a first control command for requesting the transmission of preset information to the external device when a user's first gesture is sensed as a selection input associated with the control icon, and transmit a second control command for outputting preset information from the external device to the external device when a user's second gesture is sensed as a selection input associated with the control icon.

According to an embodiment, the preset information received from the external device by the first control command may be screen information being displayed on the display unit of the external device, and the controller may display the screen information on the display unit when the screen information being displayed on the display unit of the external device is received by the wireless communication unit.

According to an embodiment, the controller may control the wireless communication unit to transmit the screen information to a device different from the external device based on a specific input being applied while the screen information is displayed on the display unit, and the different device may be selected based on a user's gaze sensed by the sensing unit.

According to an embodiment, the controller may select preset information to be output from the external device by the second control command based on the type of an event associated with the specified object captured through the camera.

According to an embodiment, the function icon may include an information icon linked to a function of checking information associated with the specified object, and the controller may analyze an image of the specified object included in an image corresponding to the external environment to acquire information associated with the specified object, and control the display unit to display at least part of the acquired information associated with the specified object when the function of checking information associated with the specified object is carried out.

According to an embodiment, the controller may adjust an output amount of information associated with the specified object according to a number of objects included in an image corresponding to the external environment.

According to an embodiment, the function icon may include a data formation icon linked to a function of forming image data for the specified object, and the controller may control the camera to capture the specified object when a selection input associated with the data formation icon is received, and control the display unit to display a preview image for the specified object captured by the camera.

According to an embodiment, when a display request for an associated data image including movement information associated with the movement of the specified object included in the preview image in a state where the preview image is displayed on the display unit, the controller may control the display unit to display the associated data image to overlap with the preview image.

According to an embodiment, when a specific movement of an object other than the specified object is sensed from an image corresponding to the external environment, the controller may control the display unit to display information indicating the specific movement of the other object.

A method of controlling a glasses-type terminal according to an embodiment of the present disclosure may include capturing an external environment by a camera, sensing a user's gaze on the external environment by a sensing unit, analyzing the user's gaze on the external environment to specify an object to which the user's gaze is directed from an image corresponding to the external environment, and locating a function icon linked to a preset function in a corresponding region that corresponds to a region in which the specified object is located based on an event associated with the specified object being captured through the camera.

According to an embodiment, the method may further include receiving a selection input associated with the function icon, and executing a function linked to the function icon based on receiving the selection input associated with the function icon.

According to an embodiment, the selection input associated with the function icon may be received by sensing the user's preset gesture in a state where the user's gaze toward the function icon is sensed by the sensing unit.

According to an embodiment, said executing a function linked to the function icon may include analyzing an image of the specified object included in an image corresponding to the external environment, acquiring information associated with the specified object based on an image analysis of the specified object, and executing a function linked to the function icon using the acquired information associated with the specified object.

According to an embodiment, wherein an event associated with the specified object is a preset movement of the specified object captured through the camera.

The glasses-type terminal according to an embodiment of the present disclosure may specify any one object in an external environment through the analysis of a user's gaze and provide an icon of a function that can be executed in association with the specified object. Accordingly, the user may intuitively receive information on executable functions associated with the specified object without directly searching for information associated with the specified object.

In addition, the user is provided with the convenience of performing various functions associated with the function icon using a non-contact input such as a change of gaze or a preset gesture.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE PREFERRED EMBODIMENTS

Figure 1:
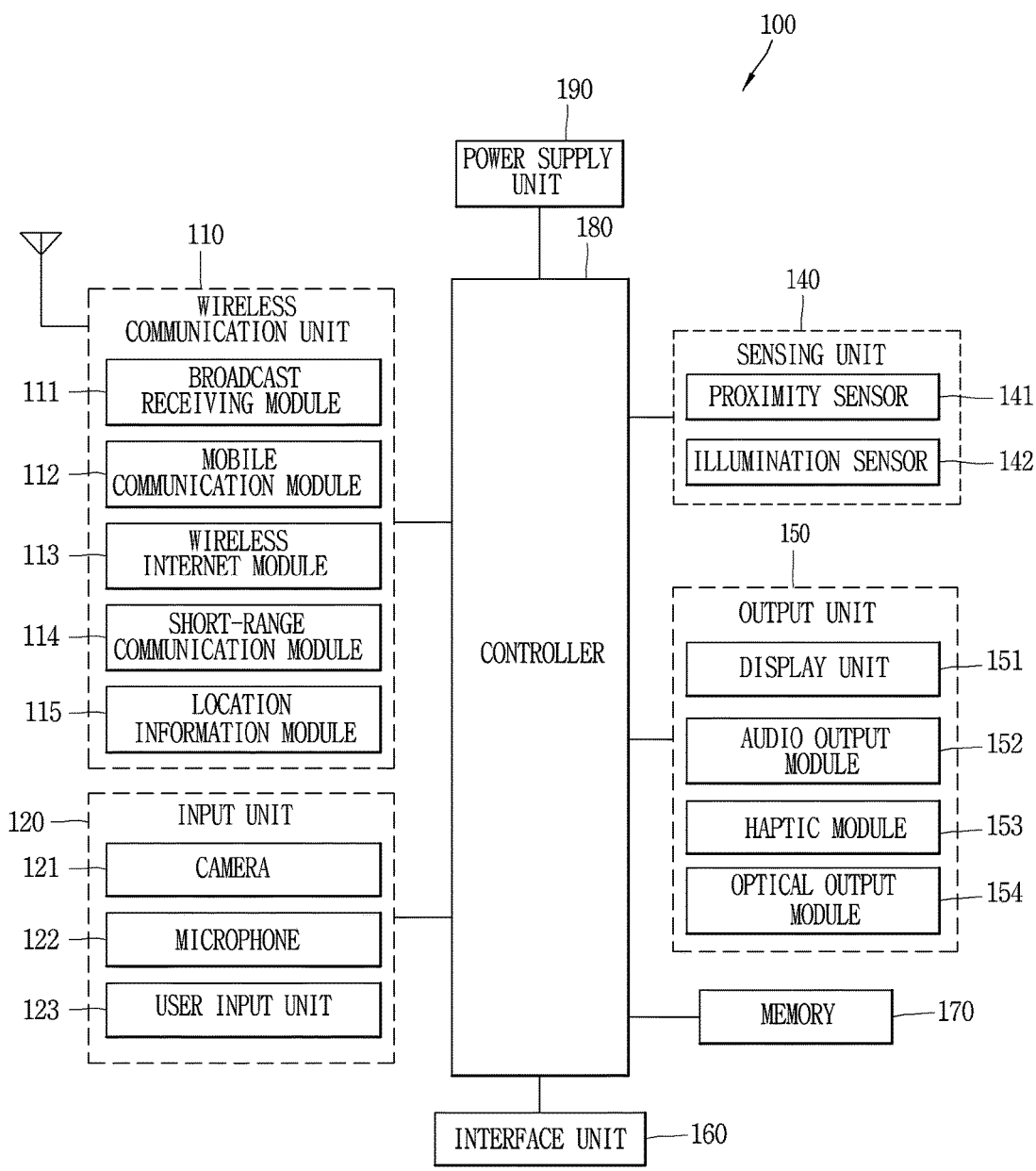
FIG. 1 is a block diagram for explaining a mobile terminal associated with the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

FIG. 1 is a block diagram for explaining a mobile terminal associated with the present disclosure. The mobile terminal 100 associated with the present disclosure may include a wireless communication unit 110, an input unit 120, a sensing unit 140, an output unit 150, an interface unit 160, a memory 170, a controller 180, a power supply unit 190 and the like. FIG. 1 illustrates the glasses-type terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the terminal 100 and another mobile terminal 100, or between the mobile terminal 100 and an external server. In addition, the wireless communication unit 110 may include one or more modules that connect the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of information within the terminal, surrounding environmental information of the mobile terminal, and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the glasses-type terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor in order to facilitate a touch screen. The touch screen may provide an output interface between the terminal 100 and a user, as well as functioning as the user input unit 123 which provides an input interface between the terminal 100 and the user.

The interface unit 160 serves as an interface with various types of external devices that can be coupled to the terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The terminal 100 may execute an appropriate control associated with a connected external device, in response to the external device being connected to the interface unit 160.

In addition, the memory 170 stores data that support various functions of the terminal 100. The memory 170 is typically implemented to store data to support various functions or features of the terminal 100. For instance, the memory 170 may be configured to store application programs executed in the terminal 100, data or instructions for operations of the terminal 100, and the like. At least some of those application programs may be downloaded from an external server via wireless communication. Some others of those application programs may be installed within the terminal 100 at the time of being shipped for basic functions of the terminal 100 (for example, receiving a call, placing a call, receiving a message, sending a message, etc.). On the other hand, the application programs may be stored in the memory 170, installed in the terminal 100, and executed by the controller 180 to perform an operation (or a function) of the terminal 100.

The controller 180 may typically control an overall operation of the terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1, in order to drive the application programs stored in the memory 170. In addition, the controller 180 may drive the application programs by combining at least two of the components included in the terminal 100 for operation.

The power supply unit 190 may receive external power or internal power and supply appropriate power required for operating respective elements and components included in the terminal 100 under the control of the controller 180.

The power supply unit 190 may include a battery, and the battery may be an embedded battery or a replaceable battery.

At least part of those elements and components may be combined to implement operation and control of the terminal or a control method of the terminal according to various exemplary embodiments described herein. Furthermore, the operation and control or the control method of the terminal may be implemented in the mobile terminal in such a manner of activating at least one application program stored in the memory 170.

Figure 2A:
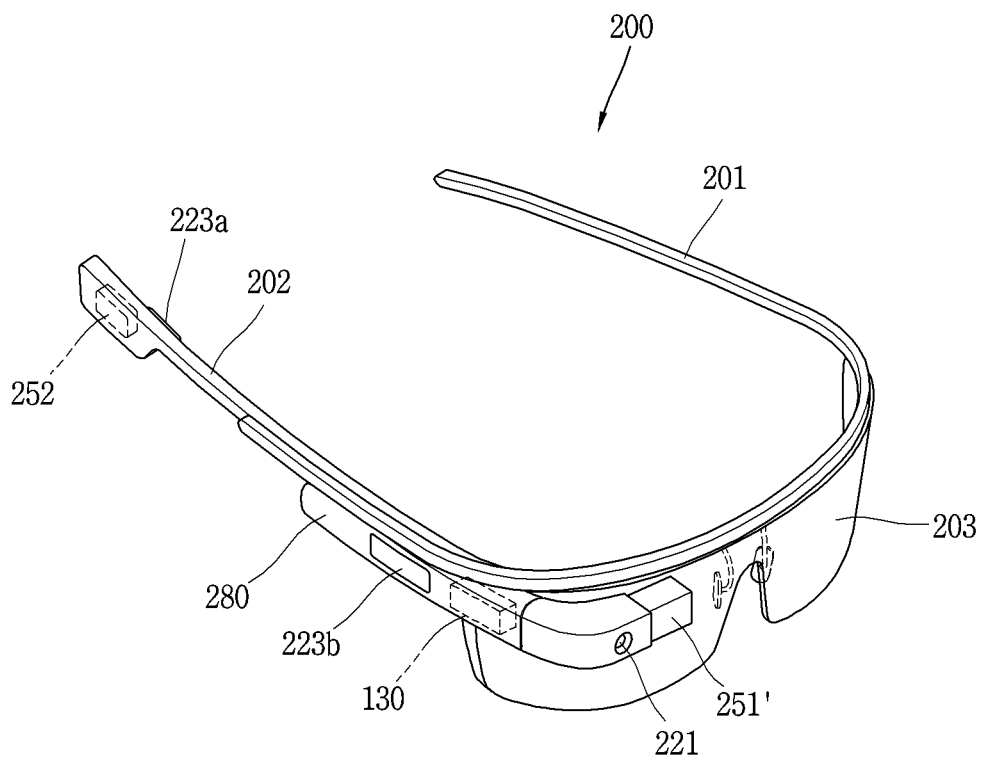
FIG. 2A is a view in which a glasses-type terminal according to an embodiment of the present disclosure is seen from one direction.
Figure 2B:
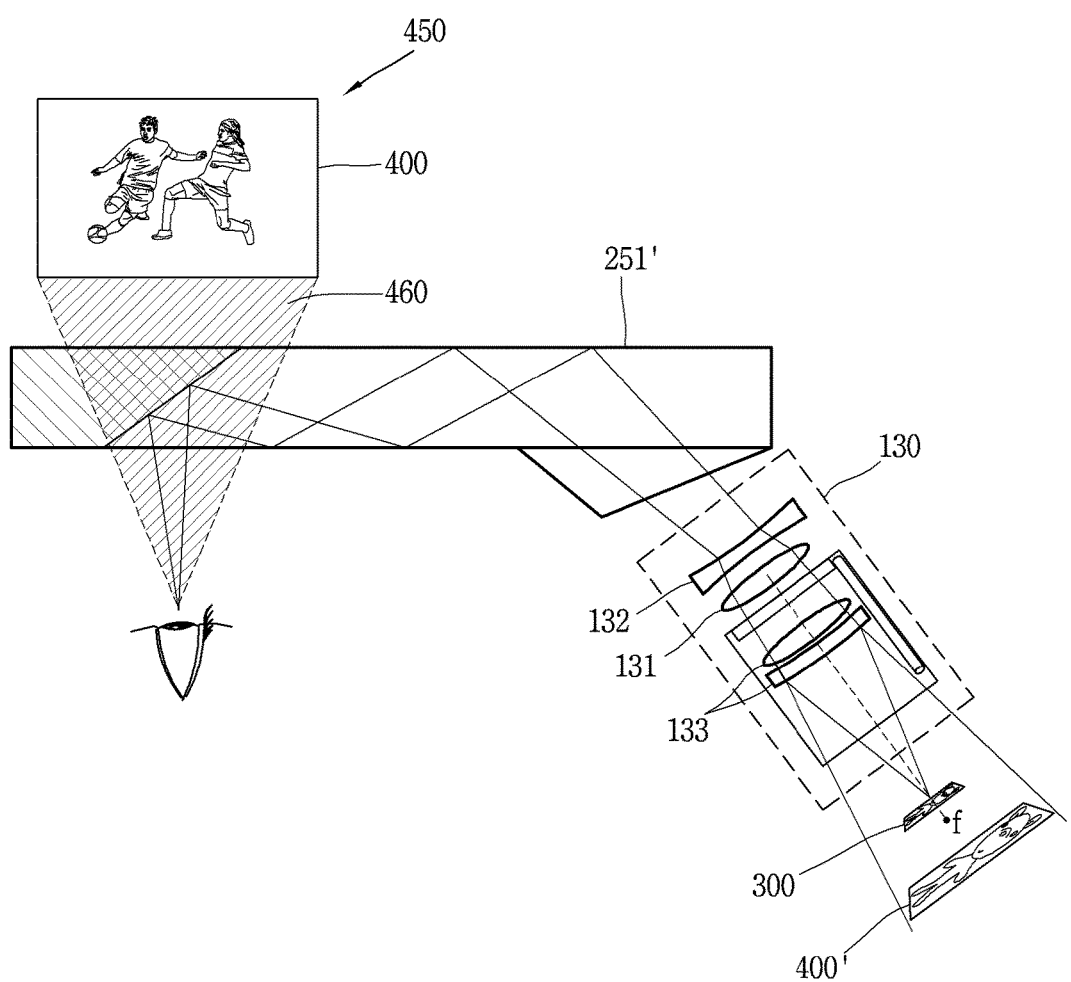
FIG. 2B is a conceptual view illustrating an optical unit included in the glasses-type terminal of FIG. 2A.

FIG. 2A is a view in which a glasses-type terminal according to an embodiment of the present disclosure is seen from one direction, and FIG. 2B is a conceptual view illustrating an optical unit included in the glasses-type terminal of FIG. 2A.

Referring to FIG. 2A, the glasses-type mobile terminal 200 may be configured to be wearable on a head of a human body and provided with a frame portion (case, housing, etc.) therefor. The frame portion may be made of a flexible material to be easily worn. It is illustrated in the drawing that the frame portion includes a first frame 201 and a second frame 202 with different materials. In general, glasses-type terminal 200 may be configured to include features that are the same or similar to that of terminal 100 of FIG. 1.

The frame portion may be supported on the head and defines a space for mounting various components. As illustrated, electronic components, such as a controller 280, an audio output module 252, and the like, may be mounted to the frame portion. Also, a lens 251' for covering either or both of the left and right eyes may be mounted on the frame portion. The prism 251' may be provided in a detachable manner.

The controller 280 controls various electronic components disposed in the glasses-type terminal 200. The controller 280 may be understood as a component corresponding to the aforementioned controller 180. The drawing illustrates that the controller 280 is installed in the frame portion on one side of the head. However, the position of the controller 280 may not be limited to this.

The camera 221 may be located adjacent to either or both of the left and right eyes to capture an image. Since the camera 221 is located adjacent to the eye, the camera 221 can acquire a scene that the user is currently viewing.

In this way, since the scene viewed by the user corresponds to the preview image obtained through the camera 221, the glasses-type terminal 200 displays a separate preview image on the display unit 251, It is possible to prevent the output from being outputted.

The glasses-type mobile terminal 200 may include user input units 223a and 223b manipulated by the user to input a control command. The user input unit 223a, 223b may employ any method if it is a tactile manner allowing the user to perform manipulation with a tactile feeling such as touch, push, or the like. The drawing illustrates a view in which the user input unit 223a, 223b operable in a push input manner and a touch input manner are disposed on the frame portion and the controller 280, respectively.

Hereinafter, the user input unit 223b in a touch input manner will be mainly described, and reference numeral 223 will be used.

Furthermore, the glasses-type terminal 200 may include a microphone (not shown) which processes input sound into electric audio data, and an audio output unit 252 for outputting an audible sound.

Referring to FIG. 2B, visual information 300 displayed through the display unit may be seen to overlap with a general field of view as a virtual image through the optical unit 130 and the prism 251'. The glasses-type terminal 200 may provide augmented reality (AR) in which a virtual image overlaps with an image (or scene, background, user's general field of view) of reality using the characteristics of the display to show one image. The optical unit 130 may be integrated into the frame 101. In other words, the optical unit 130 is not positioned in the user's field of view.

The optical unit 130 includes first and second lenses 131, 132 and a zoom lens unit 133. The virtual image 400' formed by the optical unit 130 may be reflected by the prism 251' and provided to the user's eyes.

However, the structure of the optical unit and the display unit in the glasses-type terminal is not limited thereto. The controller 280 may control the optical unit 130 to form visual information displayed on the display unit as a virtual image 400 having various sizes, and display the virtual image 300 at various position based on the user's control command.

The display unit may display the visual information 300 between a focal point (f) of the first lens 131 of the optical unit 130 and the first lens 131. Accordingly, the virtual image 400' of the visual information 300 is formed to be enlarged at a position opposite to a position where the visual information 300 is displayed, with respect to the focus (f) of the first lens 131.

The virtual image 400' may be viewed through the optical unit 130 and the prism 251' in the user's eyes. In this case, from the user's perspective, the virtual image 400 may be viewed in a virtual region 450 (or space, virtual space) located in front of the user's eyes. It may denote that the virtual image 400 of the visual information 300 is formed in a virtual region 450 out of the main body (for example, a virtual region located in front of the user's eyes). In other words, the optical unit 130 may form an image 400 (virtual image) of the visual information 300 displayed on the display unit in a virtual region 450 out of the main body (for example, a virtual region 450 (or space) located in front of the user's eyes).

In the glasses-type mobile terminal 200 according to an embodiment of the present disclosure, data related to the display position (distance) and the display size of the virtual image 400 shown in the virtual region 450 located in the front of the user's eyes may have been stored in the user's perspective.

Furthermore, the sensing unit (not shown in the drawing) may sense a user gesture performed on the glasses-type terminal 200 or in a space existing within a preset distance (or around the glasses-type terminal 200) from the glasses type terminal 200. Here, the user gesture may denote an operation formed by a part of the user's body (for example, a finger, a hand, an arm, a leg, etc.) or a target object (an object, a bar, etc.).

Hereinafter, various embodiments related to a method of controlling a glasses-type mobile terminal according to the present disclosure will be described with reference to the accompanying drawings.

The glasses-type terminal according to the present disclosure may provide a control method capable of specifying one object on the basis of the user's gaze with respect to the external environment in a captured image of an external environment, and executing a function associated with the specified object.

As a more specific example, the glasses-type terminal according to the present disclosure may be applicable to a case where a teacher wearing the glasses-type terminal looks at a plurality of students in a classroom environment including the plurality of students. In other words, the glasses-type terminal may provide a control method of analyzing a teacher's gaze on the plurality of students, specifying a student corresponding to the teacher's gaze among the plurality of students, and executing a function related to the specified object.

In addition, for the execution of a function related to the specified object, the glasses-type terminal may display various function icons associated with the preset function. As a result, the user is provided with the convenience capable of performing various functions related to one object in an external environment only by a simple operation of changing his or her gaze.

Figure 3A:
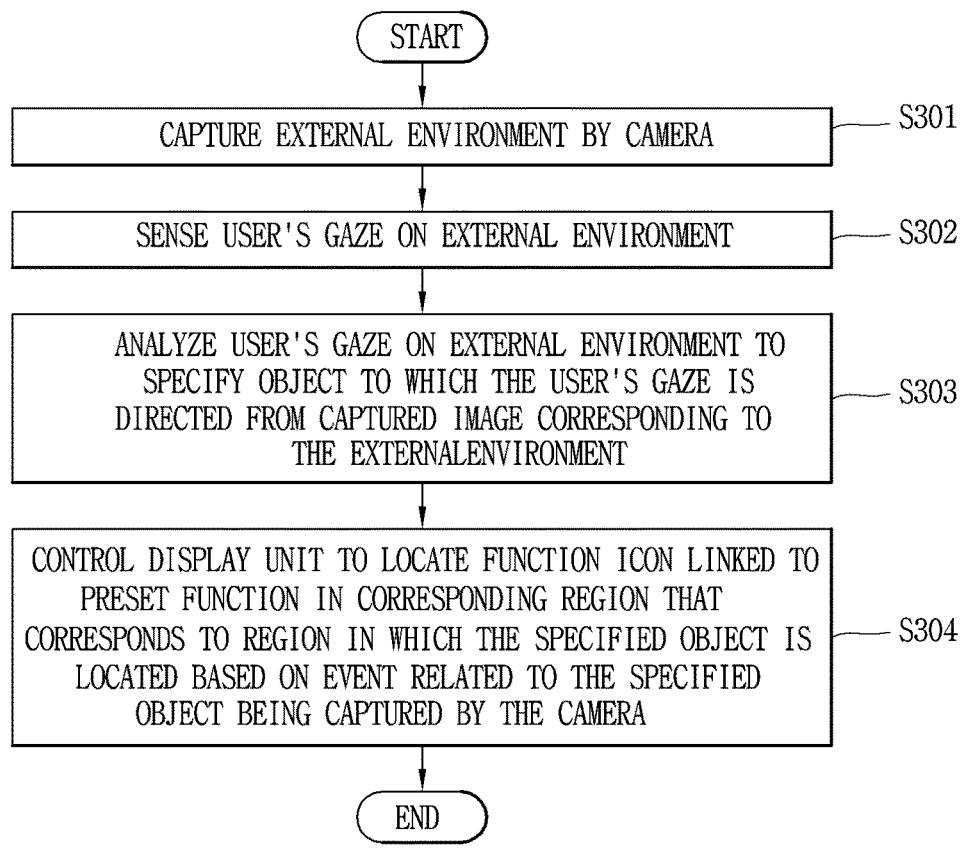
FIG. 3A is a flowchart of a control method for allowing a glasses-type terminal according to the present disclosure to provide a function icon associated with a specified object.
Figure 3B:
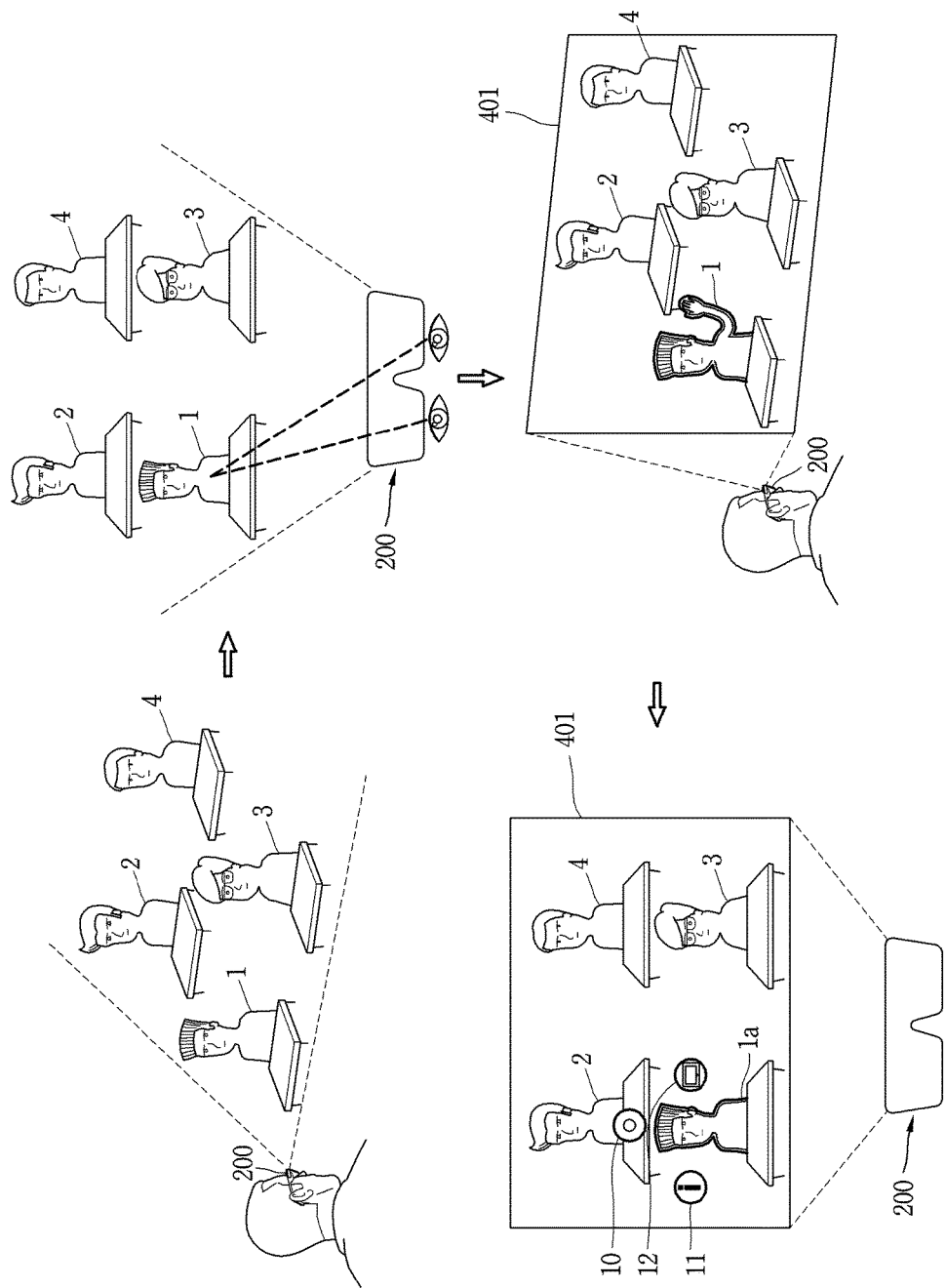
FIG. 3B is a representative view for explaining a control method of providing the function icon.

FIG. 3A is a flowchart of a control method for allowing a glasses-type terminal according to the present disclosure to provide a function icon associated with a specified object, and FIG. 3B is a representative view for explaining a control method of providing the function icon.

First, referring to FIG. 3A, an external environment may be captured by the camera of the glasses-type terminal according to the present disclosure (S301).

The camera 221 of the glasses-type terminal 200 according to the present disclosure may capture the front of the user's gaze while the user wears the glasses-type terminal 200, as described above with reference to FIG. 2A.

In addition, the camera 221 may capture the external environment in real time by a preset field of view. Here, the camera 221 may have a field of view corresponding to a visual range of the user wearing the glasses-type terminal 200.

For example, as illustrated in the first drawing of FIG. 3B, the camera 221 mounted on the glasses-type terminal 200 may capture an external environment according to a preset field of view. Here, a plurality of objects 1, 2, 3, 4 may be included in the external environment.

In addition, the glasses-type terminal 200 may sense the user's gaze on the external environment using the sensing unit (S302).

The sensing unit may sense a gaze of the user wearing the glasses-type terminal 200. To this end, the sensing unit may include a plurality of sensors capable of sensing the user's gaze.

For an example, the sensing unit may include a camera, and may sense the movement of the user's pupil from the camera. In this case, the camera 221 and the camera included in the sensing unit may be disposed at different positions of the glasses-type terminal 200. In other words, the camera included in the sensing unit may be disposed at a position capable of sensing the user's gaze.

For another example, the sensing unit may include an infrared sensor. In this case, the infrared sensor may sense the movement of the user's eyes with infrared rays reflected from the user's eyes.

When the user's gaze is sensed as described above, the user's gaze on the external environment may be analyzed to specify an object to which the user's gaze is directed from a captured image corresponding to the external environment (S303).

The controller 280 may analyze the user's gaze sensed by the sensing unit. For example, an image of the pupil movement of the user captured by the camera included in the sensing unit may be applied to a preset gaze tracking algorithm to analyze the user's gaze. In this case, the direction of the user's gaze may be determined by analyzing an image of infrared rays reflected from the user' pupil.

For another example, the controller 280 may calculate an angle of gaze formed by each of the user's eyes based on the position of the user's pupil, and determine the direction and distance of the gaze corresponding to the angle of gaze.

When the user's gaze analysis is performed as described above, the controller 280 may specify an object to which the user's gaze is directed from an image corresponding to the external environment (S303).

The object may include a person or an object as a subject included in the external environment. For example, as illustrated in FIG. 3B, a plurality of students 1, 2, 3 and 4 included in the external environment (for example, a classroom) may be included in the object.

The controller 280 may acquire direction or distance information of the user's gaze by analyzing the user's gaze, and use the information to specify an object to which the user's gaze is directed. In other words, as illustrated in the second drawing of FIG. 3B, when the user's gaze on the external environment is analyzed to be directed to any one object 1, the controller 280 may specify the one object 1 to which the user's gaze is directed.

Also, when the object is specified, the controller 280 may determine whether an event related to the specified object is captured through the camera 221. Here, the event may denote a preset movement of the specified object.

For an example, when the gaze of the specified object coincides with the user's gaze, the controller 280 may determine that an event related to the specified object has occurred. In this case, the controller 280 may determine whether or not to coincide with the user's gaze using the direction of a face image of the specified object from a captured image corresponding to the external environment.

For an example, the controller 280 may determine the occurrence of an event related to the specified object based on a preset movement of the specified object being captured. In other words, as illustrated in the third drawing of FIG. 3B, when the movement of raising a hand of the specified object 1 is captured, the controller 280 may determine that an event related to the specified object 1 has occurred.

For another example, when it is captured that a preset operation (for example, an operation of bowing the head) of the specified object is maintained for a preset period of time, the controller 280 may determine that an event related to the specified object has occurred.

The controller 280 may control the display unit 280 to locate a function icon linked to a preset function in a corresponding region that corresponds to a region in which the specified object is located based on an event related to the specified object being captured as described above.

The controller 280 may display a function icon linked to an executable function with regard to the specified object on the display unit 251 when an event related to the specified object is sensed by the camera.

The function icon may be a graphic object used for the execution of a function linked to the function icon, and a function executable in association with the function icon may be preset. Here, a function linked to the function icon may include all types of functions that are executable on the terminal.

For an example, the function icon may be an icon linked to a function for checking specific information on the specified object. In other words, the function linked to the function icon may be a function for checking personal information, identification information, performance information, and the like of the specified object.

For another example, the function icon may be an icon linked to a function for generating information related to the specified object. In other words, the function linked to the function icon may be a function (for example, an audio or video recording function) for recording or acquiring the voice, operation, movement, or current state of the specified object.

For still another example, the function icon may be an icon linked to a function of controlling an external device by wireless connection with the external device when the external device corresponding to the specified object is present. In other words, the function icon is an icon linked to a function of transmitting a control command for outputting specific information from an external device corresponding to the specified object or transmitting a control command for requesting the reception of the specific information to the external device.

Furthermore, the controller 280 may determine the display position of the function icon on the display unit 251 so that the function icon can be displayed to the user in a region adjacent to a region in which the specified object is located.

For example, when the glasses-type terminal 200 is formed with the structure of FIG. 2B, the controller 280 may display a virtual image of visual information displayed on the display unit 251 at a position away from the user by a predetermined distance within a visual range of the user.

More specifically, a virtual image formation region corresponding to the display region of the display unit 251 may be set within a visual range of the user. Here, when visual information is displayed on the display unit 251, a virtual image of the visual information may be displayed in the virtual image formation region. Also, the virtual image of the visual information displayed in the virtual image formation region overlaps with the external environment to be shown to the user.

The controller 280 may control the display unit 251 to display the virtual image of the function icon in a corresponding region that corresponds to a region in which the specified object is located within the virtual image formation region.

For the purpose of this, the controller 280 may find out the position of the specified object within a visual range of the user. In other words, the controller 280 may find out a distance and direction from the user to a point at which the specified object is located based on the user's gaze analysis.

Furthermore, the controller 280 may adjust at least one of the display position, size, and display interval of the function icon on the display unit 251 to locate the virtual image of the function icon in a corresponding region related to the found position and direction of the specified object within the virtual image formation region.

In other words, as illustrated in the third drawing of FIG. 3B, a region 401 in which a virtual image corresponding to the display region of the display unit 251 is displayed may be set within a visual range of the user.

Here, when a function icon is displayed on the display unit 251, the controller 280 may control the display unit 251 to locate a virtual image of the function icon in a corresponding region that corresponds to a region in which the specified object 1 is located within the virtual image formation region 401. Accordingly, the user may be provided with the virtual images of the function icons 10, 11, 12 in a region adjacent to the specified object, as illustrated in the fourth drawing of FIG. 3B.

On the other hand, the glasses-type terminal may include a display unit formed in a light-transmissive manner at a position corresponding to at least one of the user's eyes to display visual information. In this case, the user may view an external environment through the light-transmissive display unit. Even in this case, the controller 280 may control the display unit to display the function icon in a region of the display unit corresponding to the user's gaze.

When the glasses-type terminal is an HMD (Head Mounted Display) type terminal, a real-time captured image of the external environment may be displayed on the display unit at a position corresponding to each of the user's eyes. In this case; the controller may control the display unit to display the function icon in a composite manner in one region corresponding to the specified object on a captured image of the external environment.

As described above, the glasses-type terminal according to the present disclosure may specify an object in which the user is interested even if there is no additional input from the user, using the captured image of the external environment and the user's gaze information. In addition, the present disclosure may provide a function icon related to a specified object, thereby having an effect of allowing the user to receive information on a function that can be executed with regard to an object of his or her own interest only by a simple operation such as a change of gaze.

Hereinafter, the glasses-type terminal having the structure according to FIGS. 2A and 2B will be described as a main embodiment. However, the glasses-type terminal according to an embodiment of the present disclosure is not limited to the structure of the glasses-type terminal described with reference to FIGS. 2A and 2B. Moreover, for the sake of convenience, a virtual image of the function icon will be expressed in the same manner as the function icon.

The user may execute his or her desired function using the function icon. More specifically, in a state in which the function icon is displayed, the controller 280 may execute a function linked to the function icon based on receiving a selection input associated with the function icon from the user.

The selection input may be received in a variety of ways. For example, when a user's preset gesture is sensed by the sensing unit while the function icon is displayed, the controller 280 may determine that the selection input has been received. In other words, whether or not the user has received the selection input may be determined by sensing the user's eye blinking (at least one of the left and right eyes is blinking, a preset number of blinking, or the like) gesture or sensing the user's preset hand gesture. In this case, the sensing unit may include a plurality of sensors capable of sensing the user's various gestures.

For another example, the selection input may be received by a touch or push applied to a user input unit (for example, a touch key, a push key, etc.) provided in the glasses-type terminal.

Meanwhile, as described above, the function icon may be linked to all types of functions executable on the terminal, and thus a plurality of function icons linked to each of a plurality of functions may be displayed. In this case, the controller 280 may select a function icon linked to a function to be executed by the user among the plurality of function icons based on the user's gaze analysis.

In other words, the controller 280 may analyze the user's gaze in a state where a plurality of function icons are displayed to specify a function icon to which the user's gaze is directed among the plurality of function icons. In addition, the controller 280 may execute a function linked the specified function icon based on sensing the user's preset gesture while the function icon is specified.

Hereinafter, various embodiments in which a function associated with the specified object is executed using the function icon will be described with reference to the accompanying drawings.

Figure 4A:
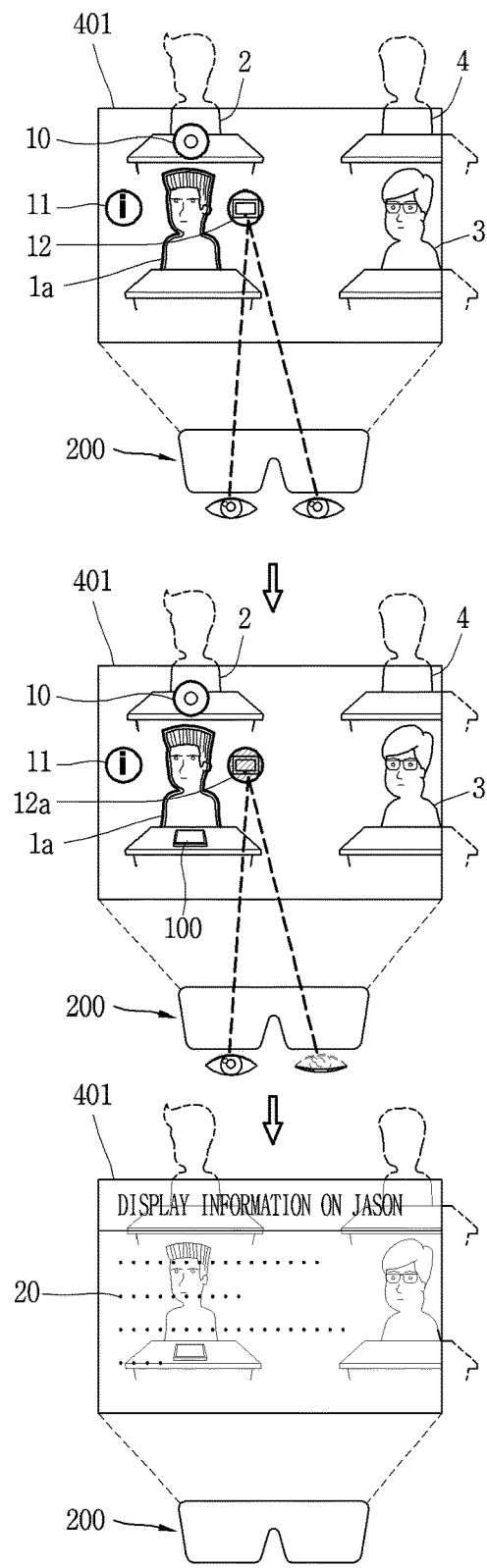
FIGS. 4A and 4B are views illustrating an embodiment in which a control icon associated with a function linked with an external device corresponding to the specified object is selected.
Figure 4B:
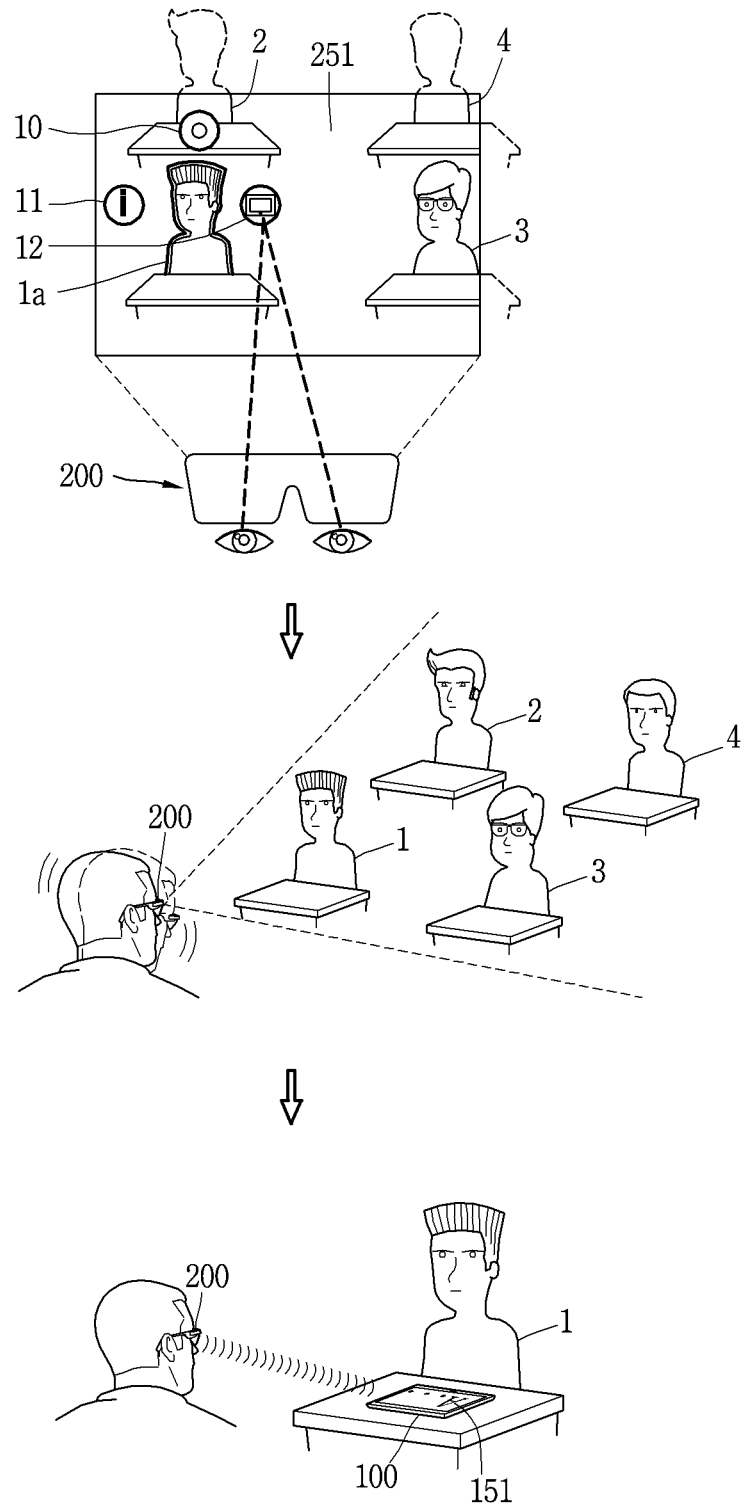

FIGS. 4A and 4B are views illustrating an embodiment in which a control icon linked to a function for controlling an external device corresponding to the specified object is selected.

First, referring to FIG. 4A, the controller 280 may specify an object in the external environment based on the user's gaze analysis. In this case, the controller 280 may give a specific visual effect to the specified object so that the user can recognize the specified object.

In other words, as illustrated in the first drawing of FIG. 4A, the controller 280 may control the display unit 251 such that a specific visual effect overlaps with a position of the specified object in the virtual image formation region 401 corresponding to the display region of the display unit 251.

Furthermore, the controller 280 may display a function icon linked to an executable function with regard to the specified object 1 on the display unit 251. When the function icon is displayed on the display unit 251, the function icons 10, 11, 12 may be displayed in a corresponding region that corresponds to the specified object in the virtual image formation region 401.

When a plurality of function icons are displayed as described above, the controller 280 may analyze the user's gaze to specify a function icon to which the user's gaze is directed among the function icons 10, 11, 12.

Similarly to a case where the object is specified, the controller 280 may control the display unit 12a to display a function icon 12 specified based on the user's gaze in a distinguished manner, as illustrated in the second drawing of FIG. 4A.

When a preset gesture is applied by the user in a state where one function icon is specified, the controller 280 may determine that the user's selection input for the function icon has been received.

In other words, as illustrated in the second drawing of FIG. 4A, when the user's preset gesture (a gesture of blinking one eye) is sensed by the sensing unit in a state where one function icon 12 is specified, the controller 280 may execute a function linked to the specified function icon 12.

Meanwhile, the controller 280 may acquire information on the specified object for use in executing a function linked to the function icon. More specifically, the controller 280 may extract an image of the specified object from an image corresponding to the external environment, and analyze the image of the specified object. Then, based on the image analysis of the specified object, the controller 280 may acquire information on the specified object.

Here, the information on the specified object may have been stored in the memory of the glasses-type terminal along with the image information of the specified object. Also, the controller 280 may control the wireless communication unit to acquire information on the specified object corresponding to the image of the specified object from an external server.

When the function icon is a function for controlling an external device corresponding to the specified object, the information on the specified object may correspond to the identification information of the external device for wireless connection with the external device.

In this case, the controller 280 may control the wireless communication unit to connect to the external device corresponding to the specified object 1 in a wireless manner using the acquired identification information of the external device.

Meanwhile, when the controller 280 is connected to the external device in a wireless manner, the controller 280 may transmit a control command for transmitting and receiving information to and from the external device to the external device. Here, the type of the control command for controlling the external device corresponding to the specified object may be determined based on an input for selecting the function icon.

For example, when a first gesture by the user is sensed while the function icon is specified, the controller 280 may transmit a control command for receiving preset information from the external device to the external device. On the contrary, when a second gesture by the user is sensed while the function icon is specified, a control command for outputting preset information may be transmitted to the external device.

More specifically, in a state where the function icon 12 linked to the control function of the external device 100 is specified, as illustrated in the second drawing of FIG. 4A, a gesture of blinking one eye of the user may be sensed by the sensing unit. In this case, the controller 280 may transmit a control command for receiving preset information from the external device 100. For an example, the preset information may be screen information currently being displayed on the display unit 151 of the external device 100.

In this manner, when preset information is received from the external device 100, the controller 280 may display the received screen information on the display unit 251. In addition, the virtual image 20 of the screen information received from the external device 100 may be shown to the user in a state of overlapping with a plurality of objects 1, 2, 3, 4 located in the external environment.

For another example, in the state where the function icon 12 linked to the control function of the external device 100 is specified based on the user's gaze as illustrated in FIG. 4B, a user's gesture of nodding his or her head may be sensed as illustrated in the second drawing of FIG. 4B.

In this manner, when the user's gesture is sensed, the controller 280 may control the wireless communication unit to transmit preset information to the external device 100. For an example, the preset information may be visual information that can be displayed on the display unit 151 of the external device 100.

Therefore, the user may easily select a function icon linked to a function to be executed by himself or herself among the plurality of function icons by using his or her gaze. In addition, the user may use various gestures for selecting function icons selectively, thereby having an effect of selectively executing a specific function related to any one function.

When information is received from an external device corresponding to the specified object, the controller 280 may temporarily store the received information in the memory. At this time, the user may have a need to transmit the received information to another external device so as to check the received information through a larger display unit or share the received information with other people.

Accordingly, the glasses-type terminal according to an embodiment of the present disclosure may provide a function of sharing information received from a first external device with a second external device when there is an additional input from the user in a state where the information received from the first external device is displayed on the display unit.

Regarding this, it will be described with reference to FIGS. 7A and 7B. For the sake of convenience, an external device corresponding to a specified object is referred to as a first external device, and an external device other than the first external device is referred to as a second external device.

Figure 5A:
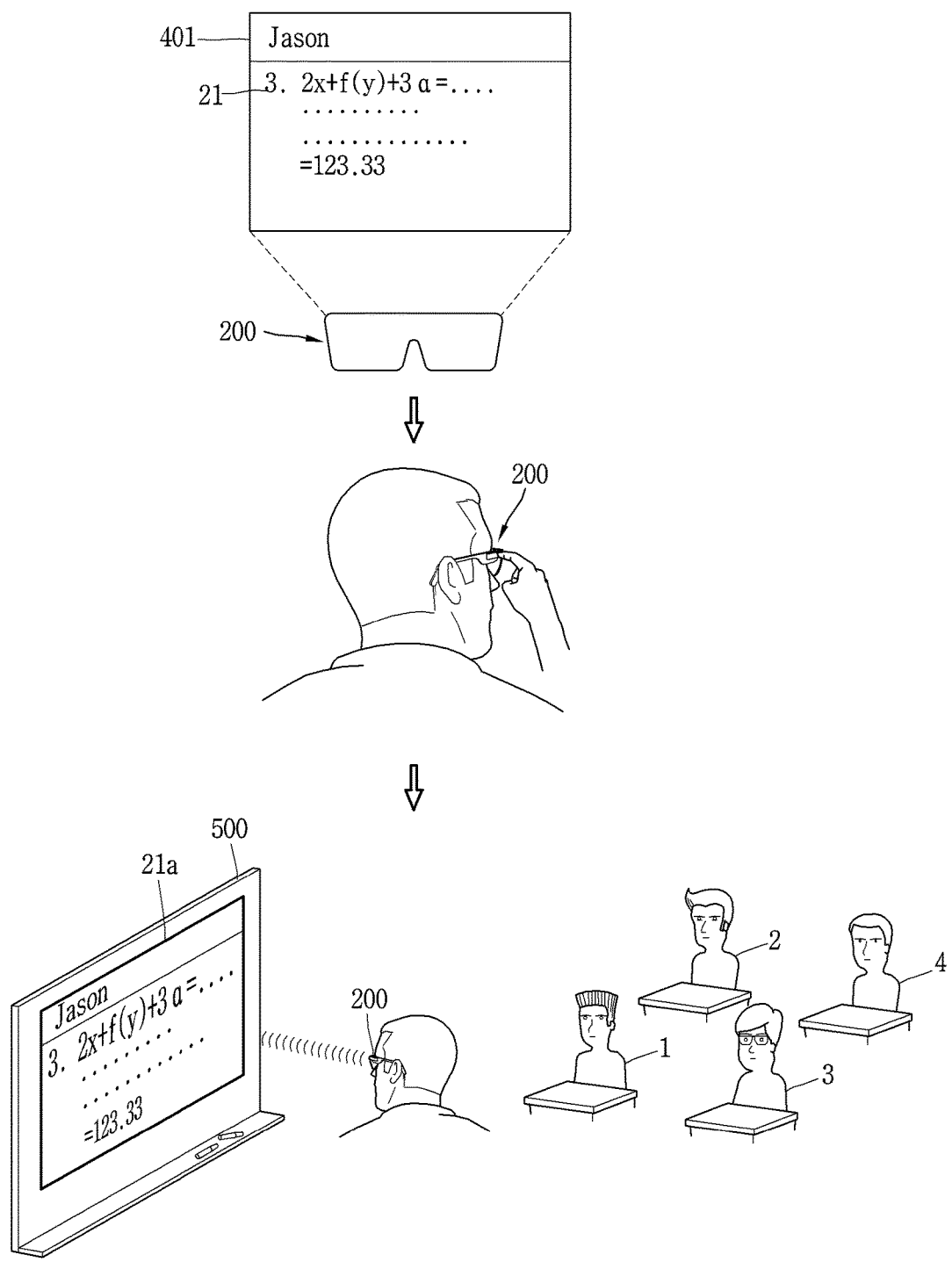
FIGS. 5A and 5B are views illustrating an embodiment in which information received from a first external device is transferred to a second external device.
Figure 5B:
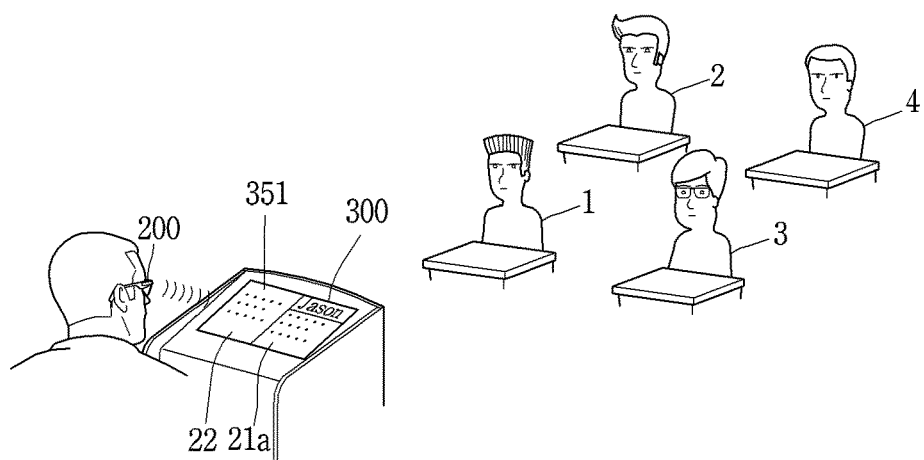

FIGS. 5A and 5B are views illustrating an embodiment in which information received from a first external device is transferred to a second external device.

First, referring to FIG. 5A, information may be received from the first external device, and the controller 280 may display the received information on the display unit 251. In addition, the controller 280 may temporarily store the received information in the memory.

In this manner, in a state where information received from the first external device is displayed on the display unit 251, a specific input may be applied from the user. For example, the specific input may be a touch input applied to the main body of the glasses-type terminal 200.

When the user's touch input is applied to the main body of the glasses type terminal 200, the controller 280 may terminate the display of the received information on the display unit 251 as illustrated in the second drawing of FIG. 5A. Accordingly, the virtual image 21 of the received information may disappear within a visual range of the user. Also, based on a touch input being applied to the glasses-type terminal, the controller 280 may activate the camera 221 to capture the front (external environment).

When the user's touch input maintained in the main body of the glasses type terminal is released, the controller 280 may control the sensing unit to sense the user's gaze when the touch input is released. In addition, the controller 280 may specify an object to which the user's gaze is directed based on the user's gaze analysis on a captured image corresponding to an external environment captured through the camera 221 subsequent to activating the camera 221.

Here, the object may be a subject included in the external environment as well as the target. For an example, the object may be a second external device. When the object is specified, the controller 280 may analyze an image of a second external device corresponding to the object, and acquire identification information corresponding to the second external device. Here, the identification information corresponding to the second external device may have been registered in the memory along with an image of the second external device.

Furthermore, the controller 280 may control the wireless communication unit to transfer information received from the first external device to the second external device. As described above, the information received from the first external device may be transferred to the second external device 500, and the second external device may display the received information 21a on the display unit of the second external device 500.

In this manner, in a state where information received from the first external device is displayed on the display unit, the user may easily share the received information with the second external device only by an operation of applying a touch to the main body of the glasses-type terminal and an operation of changing his or her gaze.

In FIG. 5B, similarly to FIG. 5A, when the user may hold his or her gaze toward the second external device 300 at the time of holding a touch to the glasses-type terminal and releasing the touch to transfer information received from the first external device to the second external device 300.

At this time, when there is information previously displayed on the display unit 351 of the second external device 300, information received from the first external device may be displayed together with the previously displayed information. In other words, as illustrated in the third drawing of FIG. 5B, the display unit 351 of the second external device 300 may be divided into a plurality of regions, and information 22 previously displayed on the display unit 351 of the second external device and information 21a received from the first external device may be displayed at the same time.

Accordingly, the user may check information received from the first external device while comparing it with information previously displayed on the second external device using the second external device. The method of displaying information received from the first external device on the display unit of the second external device may be changed by the setting of the eyeglass terminal or the second external device.

When a function of controlling an external device corresponding to the specified object is executed, the controller 280 may form a control command to output preset information from the output unit of the external device. Here, the preset information may include all types of information that can be output to the output unit of the external device. For example, the preset information may include visual information that can be displayed through the display unit of the external device, audible information that can be output through the audio output unit, and a preset type of vibration that can be output through the haptic module of the external device.

At this time, the controller 280 may select information to be output from the external device among various information that can be output from the external device, based on various conditions. Regarding this, it will be described with reference to FIGS. 6A and 6B.

Figure 6A:
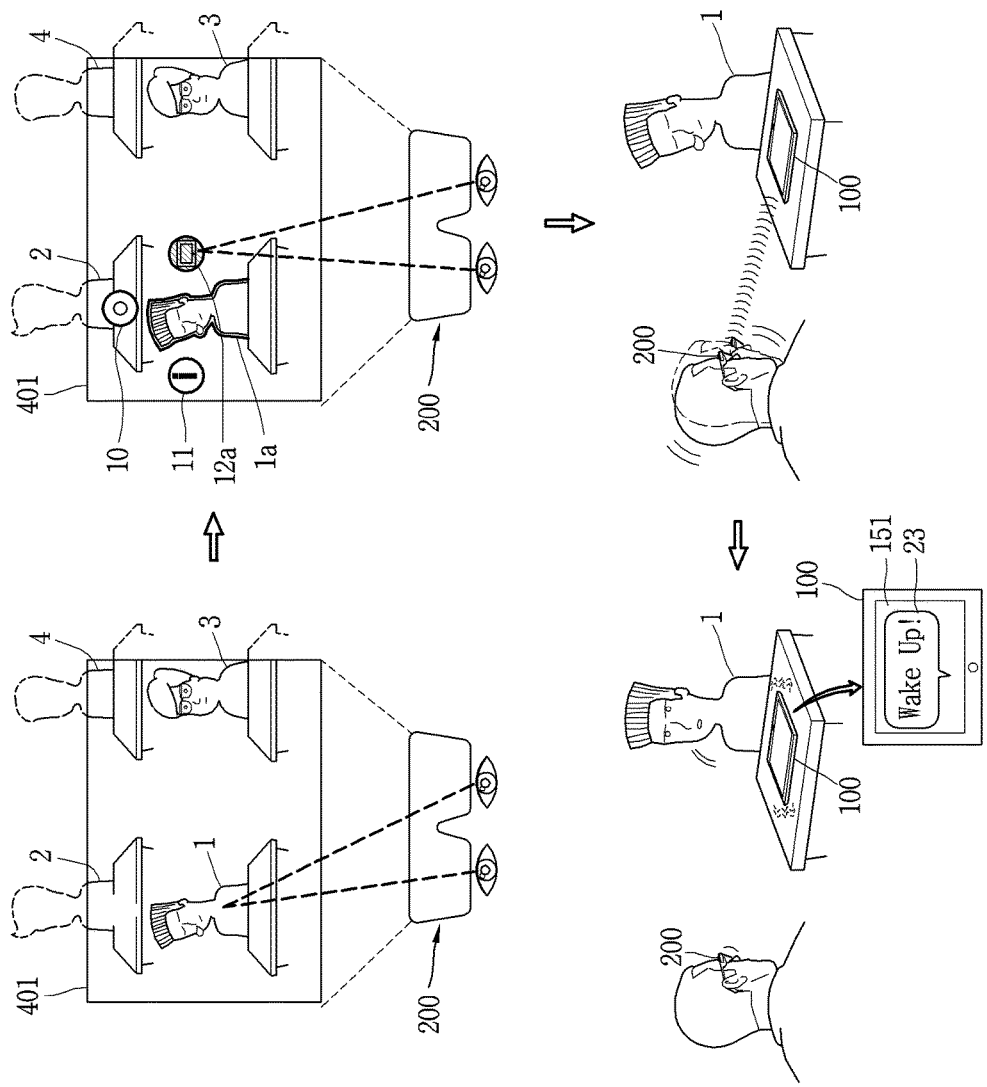
FIGS. 6A and 6B are views illustrating an embodiment in which a glasses-type terminal controls an external device to output preset information from the external device.
Figure 6B:
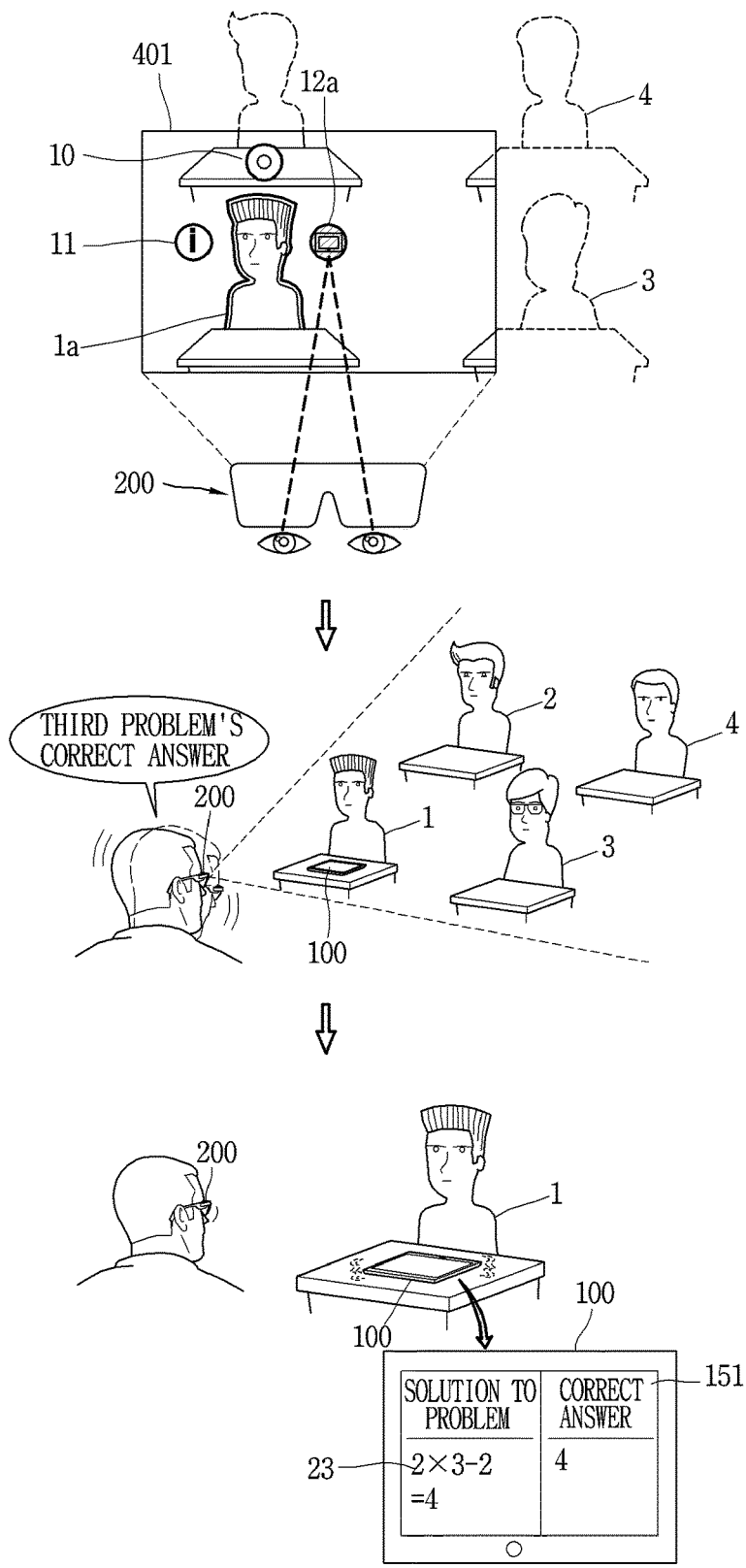

FIGS. 6A and 6B are views illustrating an embodiment in which a glasses-type terminal controls an external device to output preset information from the external device.

First, referring to FIG. 6A, when the user's gaze is directed to any one object 1, the controller 280 may specify an object to which the user's gaze is directed from an image corresponding to an external environment captured by the camera 221.

In addition, the controller 280 may sense that an event related to the specified object has occurred in a captured image corresponding to the external environment by the camera 221.

The event related to the specified object may be defined as various movements related to the specified object, such as sensing a preset movement of the specified object or sensing that the preset movement is maintained for a preset period of time. For example, as illustrated in the first and second drawings of FIG. 6A, the controller 280 may sense that a bowing operation of the specified object 1 is maintained for a preset period of time, through the camera 221.

Accordingly, the user may view a virtual image of the function icon displayed on the display unit 251 in a corresponding region that corresponds to the specified object, as illustrated in the second drawing of FIG. 6A.

At this time, as illustrated in the third drawing of FIG. 6A, the user may apply a preset gesture (a gesture of nodding his or her head) while holding his or her gaze on a function icon for controlling an external device.

In this case, the controller 280 may transmit a control command for outputting preset information from the external device 100 according to the preset gesture. Here, the preset information may be determined according to the type of an event related to the specified object. In other words, the controller 280 may select the type of information to be output from the external device based on the type of an event related to the specified object.

Therefore, even when the same gesture is applied to execute an information transfer function to an external device, the user may output different information from the external device according to the state of the specified object sensed from an event related to the specified object.

On the other hand, the user may directly designate the type of information to be transmitted to the external device using voice.

In other words, in a state 12a where a function icon for controlling the external device 100 is specified by the user's gaze as illustrated in the first drawing of FIG. 6B, a preset selection gesture (a gesture of nodding his or her head) may be applied as illustrated in the second drawing of FIG. 6B. Furthermore, while applying the selection gesture, information to be transmitted to the external device 100 may be entered by voice.

At this time, the controller 228 may analyze voice entered together with the selection gesture to select the type of information to be transmitted to the external device 100 by the selection gesture.

In addition, information 23 transmitted to the external device 100 may be displayed on the display unit 151 of the external device 100. Accordingly, the user may enter voice with a selection gesture for executing a function of controlling an external device to receive the convenience capable of transmitting desired information to the external device according to the selection gesture.

The function icon may be a data formation icon linked to a function of forming data associated with the specified object. Hereinafter, an embodiment related thereto will be described with reference to FIGS. 7A and 7B.

Figure 7A:
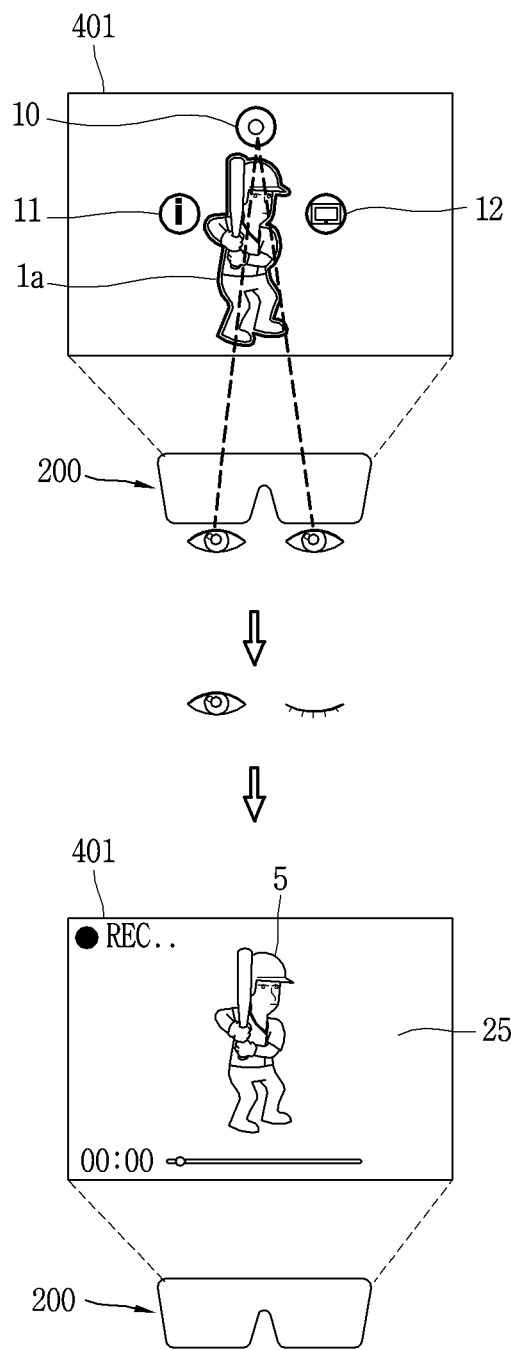
FIGS. 7A and 7B are views illustrating an embodiment in which a function of forming data associated with a specified object is carried out.
Figure 7B:
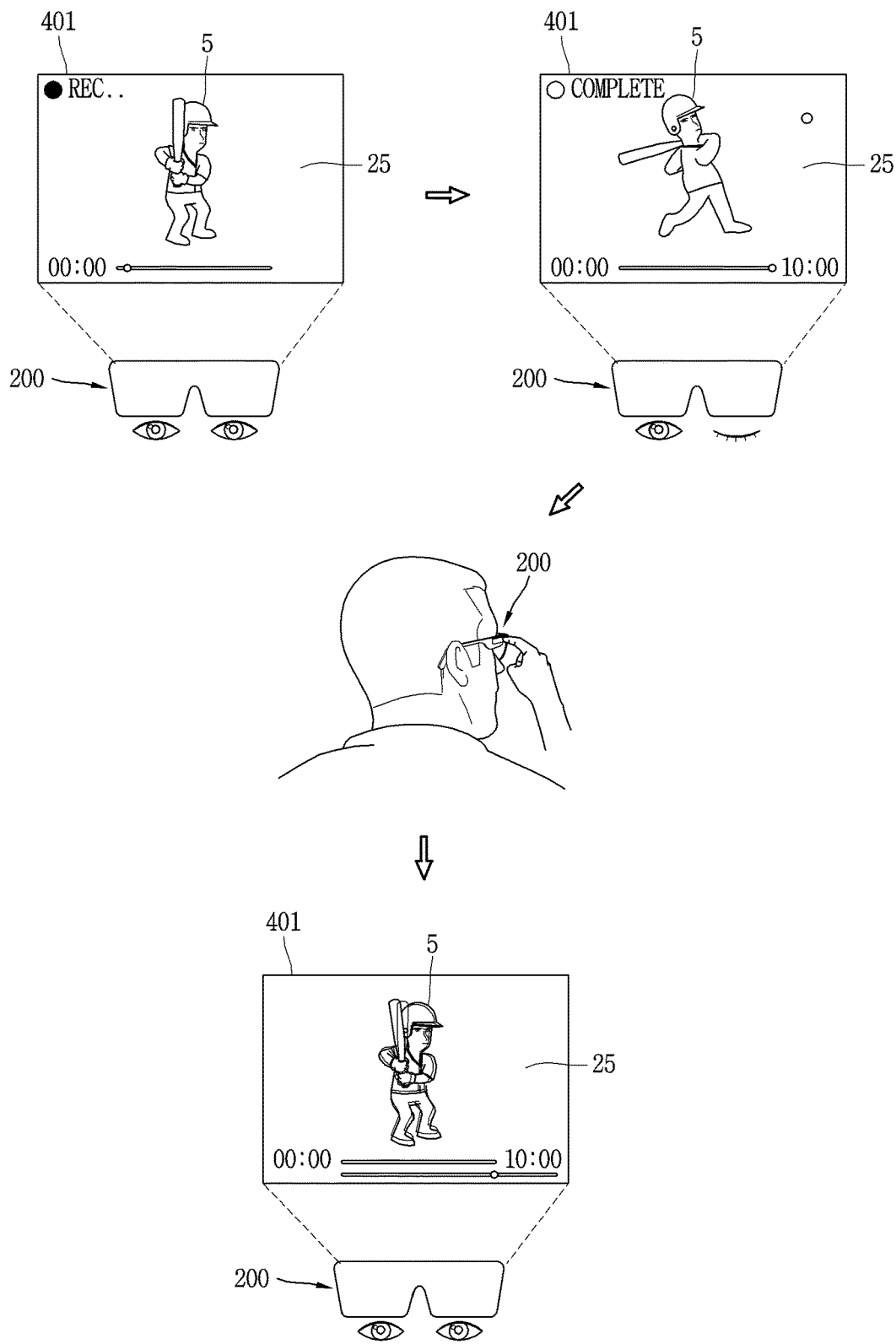

FIGS. 7A and 7B are views illustrating an embodiment in which a function of generating information associated with a specified object is carried out.

First, referring to FIG. 7A, the glasses-type mobile terminal 200 may execute a function linked to a specified function icon 10 based on a user's eye-gaze analysis. Here, a function linked to the function icon 10 may be a data formation icon that forms image data for the specified object 5.

More specifically, when a preset gesture (for example, a gesture of blinking one eye, as illustrated in the second drawing of FIG. 7A) is sensed from the user while the user's gaze toward the function icon 10 is sensed, the controller 280 may execute the data formation function.

First, the controller 280 may control the camera 221 to perform capturing on the specified object based on the user's preset gesture being sensed.

In this case, the controller 280 may display a preview image 25 captured on the specified object 5 in real time on the display unit 251. Here, the preview image 25 may be shown to the user through a virtual image formation region 401 corresponding to the display region of the display unit.

The controller 280 may control the camera 221 to perform the capturing of the specified object 5 for a preset period of time. On the contrary, as illustrated in the second drawing of FIG. 7B, when the user's preset gesture is sensed while capturing the specified object 5, the controller 280 may stop the capturing of the specified object 5. In this case, image data for the specified object 5 may be formed by images taken from the time of performing the capturing until the time of stopping the capturing.

Meanwhile, in a state where a preview image for the specified object 5 is displayed on the display unit 251, a specific input may be applied to the glasses-type terminal 200 by the user. In this case, the controller 280 may search for associated data including movement information associated with the movement of the specified object 5 included in the preview image.

For example, the associated data may include pre-formed image data of the specified object including the associated movement information, image data of another object including the associated movement information, and the like. The associated data may be stored in the memory of the glasses-type terminal 200 or may be received from an external server based on the user's specific input.

The controller 280 may overlap the associated data with the preview image to compare the associated data with the preview image.

For example, the controller 280 may select a section including a movement associated with the movement of the specified object during the associated data section. Furthermore, the controller 280 may control the display unit 251 to overlap the selected section of the associated data with the movement section of the specified object on the preview image in a corresponding manner.

Accordingly, the user may form image data for any one object located in an external environment using his or her gaze or compare associated data related to the any one object with the formed image data.

Although not shown in the drawing, when the data formation icon is primarily selected, a sub-menu icon for various functions that can be executed in association with the function icon may be displayed. In this case, the sub-menu icon may be secondarily selected based on a user's gaze and a specific operation being sensed, and a function linked to the selected sub-menu icon may be executed accordingly.

Furthermore, the function icon may be an information icon linked to a function for checking information related to the specified object. Regarding this, it will be described with reference to FIGS. 8A and 8B.

Figure 8A:
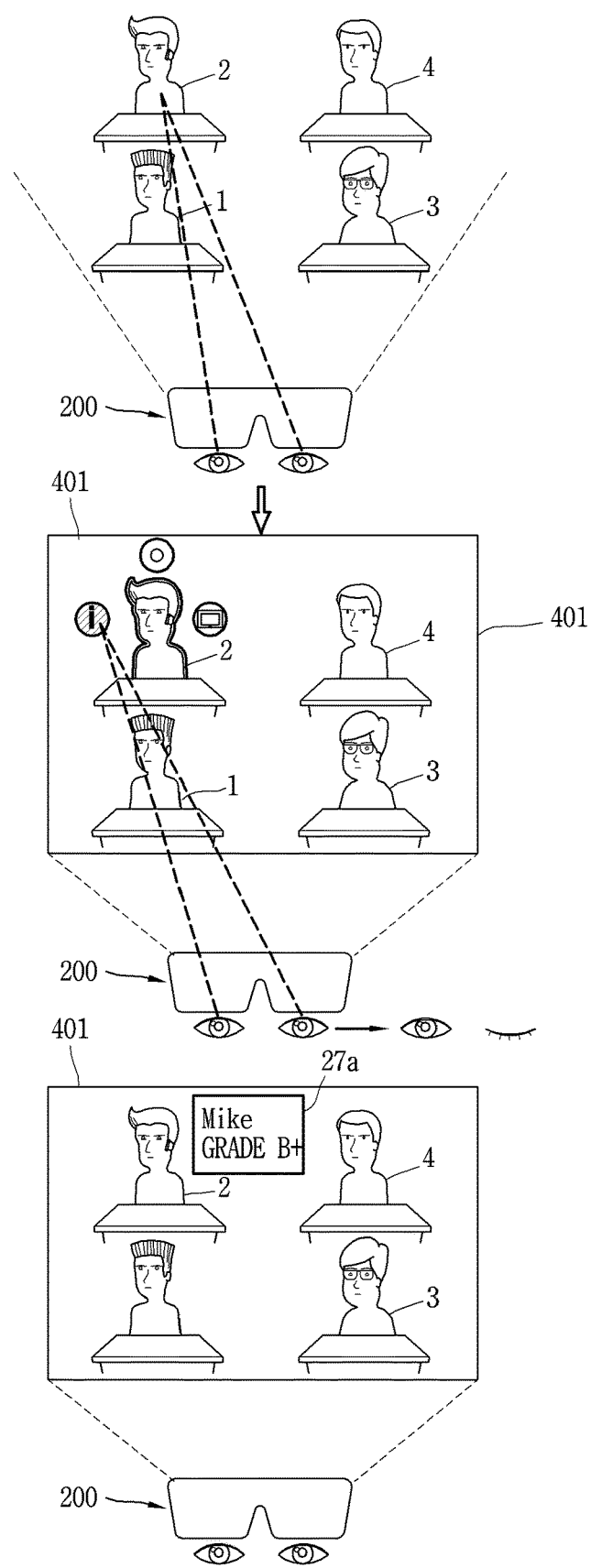
FIGS. 8A and 8B are views illustrating an embodiment in which a function of checking information associated with a specified object is carried out.
Figure 8B:
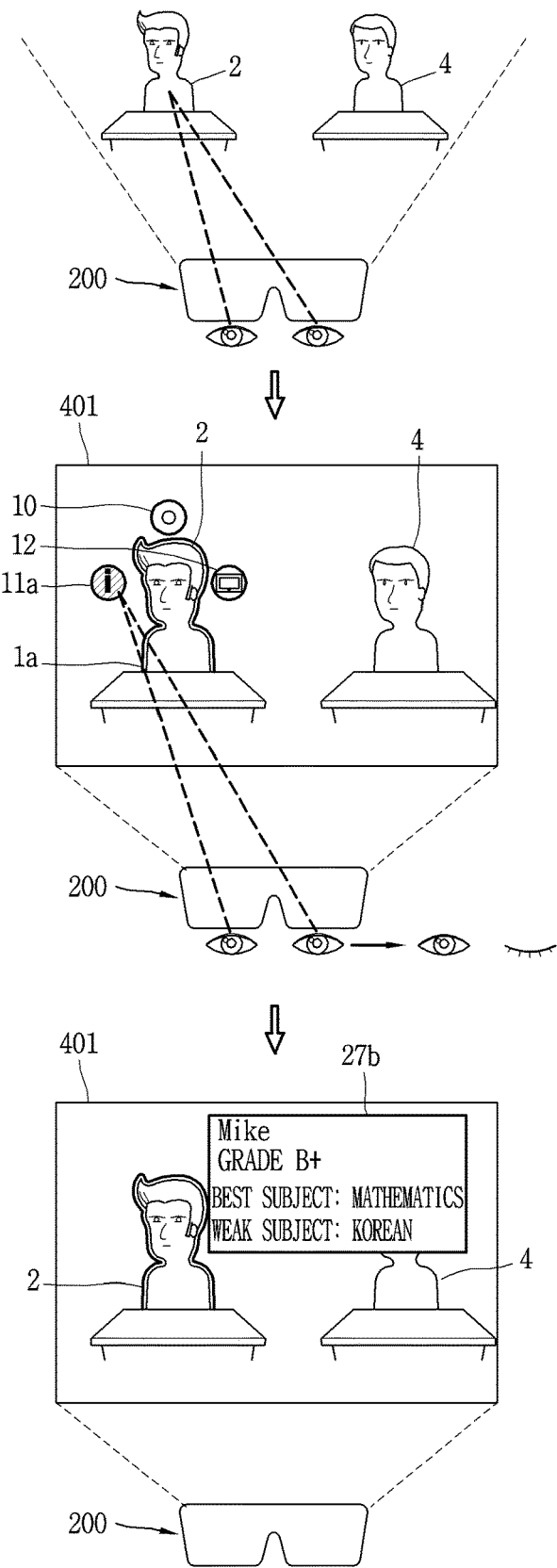

FIGS. 8A and 8B are views illustrating an embodiment in which a function of checking information associated with a specified object is carried out.

Referring to FIG. 8A, the object 1 is specified based on the user's gaze analysis on any one object 2, and function icons 10, 11, 12 may be located in a corresponding region that corresponds to a region in which the specified object 2 is located, as illustrated in the second drawing of FIG. 8A.

In addition, the function icon 10 linked to a function of checking information associated with the specified object may be specified among the function icons 10, 11, 12. In this manner, when a preset gesture by the user is sensed while the function icon 10 is specified, the controller 280 may display information associated with the specified object on the display unit 251.

Here, the information associated with the specified object may include all types of information capable of identifying the specified object such as, for example, personal information of the specified object, performance information, and the like.

Furthermore, as illustrated in the third drawing of FIG. 8A, the controller 280 may control the display unit 251 to locate information 27a related to the specified object in a region corresponding to a region in which the specified object is located, similarly to the function icon.

On the other hand, the controller 280 may determine an output amount of information related to the specified object according to a number of objects included in a field of view range of the camera 221.

More specifically, since the camera 221 captures an external environment by a preset field of view, a number of objects to be captured by the camera 221 may vary as a distance between the user and the objects included in the external environment varies.

For example, as illustrated in FIG. 8A, when the user is located relatively far away from objects included in the external environment, four objects may be included in the field of view range of the camera. On the contrary, as illustrated in FIG. 8B, when the user is located relatively close to objects included in the external environment, two objects may be included in the field of view range of the camera 221.

In this case, as illustrated in the third drawings of FIGS. 8A and 8B, the controller 280 may control the display unit 251 such that the output amount 27b of the information when a small number of objects are included in the field of view range of the camera 221 is greater than the output amount 27a of information when a large number of objects are included in the field of view range of the camera 221.

Accordingly, when the user looks at the specified object through a virtual image formation area 401 corresponding to the display region of the display unit 251, the user may be provided with an appropriate amount of information within his/her own field of view.

In the above, various embodiments that can be carried out in relation to any one specific object when the user's gaze is directed to the any one specific object have been described. Hereinafter, embodiments in which the glasses-type terminal according to the present disclosure can be carried out when the user's gaze is not specified toward an object will be described.

The glasses-type terminal according to the present disclosure may perform wireless communication with a plurality of external devices included within a preset distance from the glasses-type terminal. In this case, the glasses-type terminal may simultaneously transmit information to each of the plurality of external devices or simultaneously receive information from each of the plurality of external devices based on a user's gaze and preset movement being sensed. To this end, the glasses-type terminal enters a specific mode to be connected in a wireless manner to each of a plurality of external device previously registered in the glasses-type terminal.

Figure 9A:
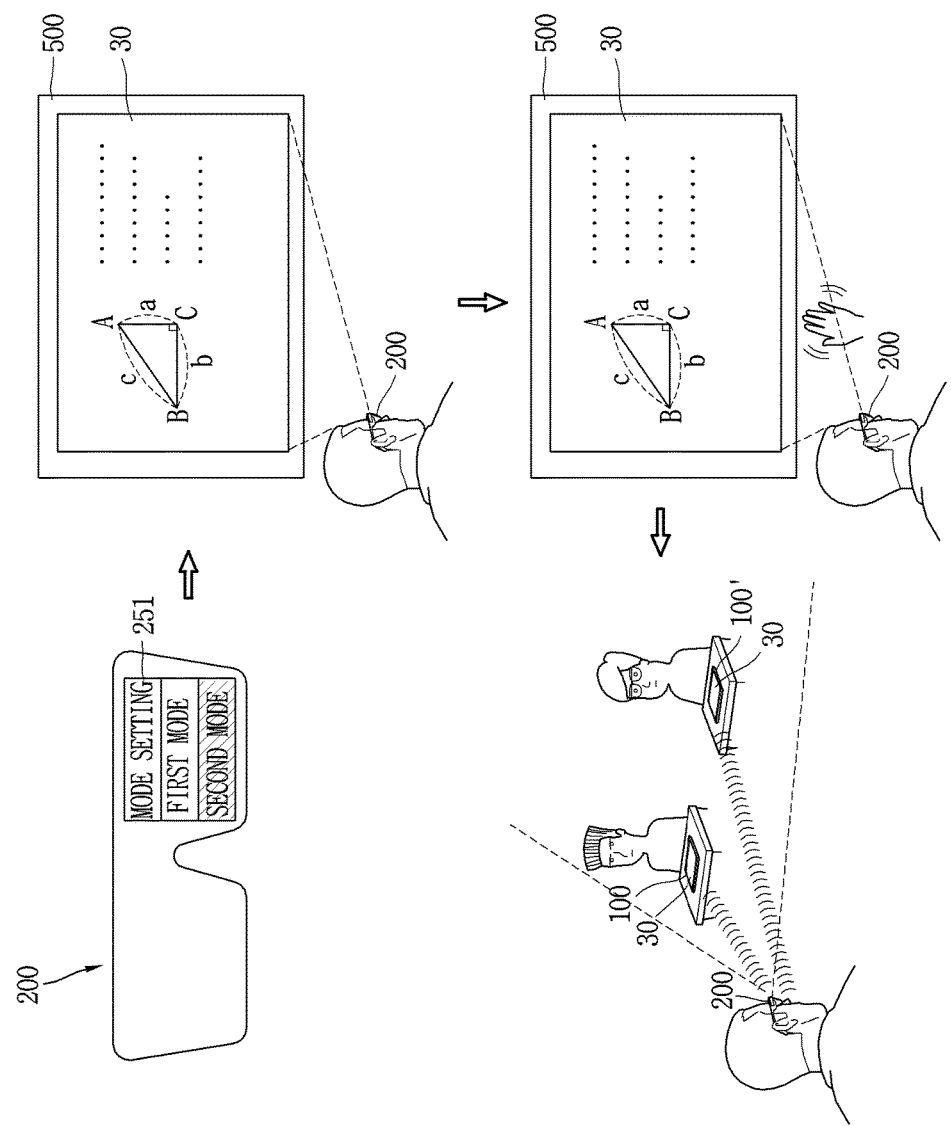
FIGS. 9A and 9B are views illustrating an embodiment in which information is transmitted from a glasses-type terminal to a plurality of external devices, respectively.
Figure 9B:
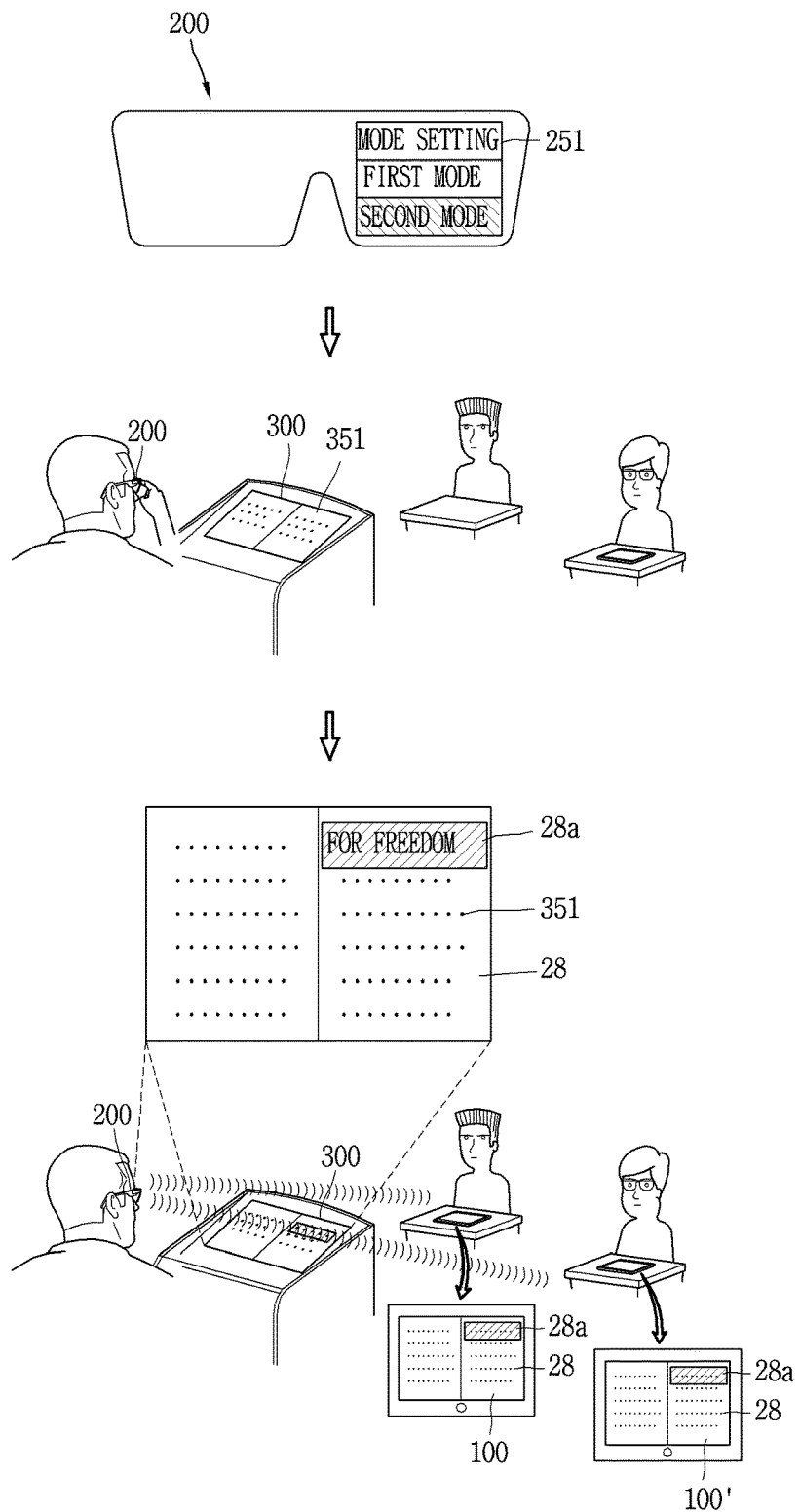

FIGS. 9A and 9B are views illustrating an embodiment in which information is transmitted from a glasses-type terminal to a plurality of external devices, respectively.

First, referring to FIG. 9A, the glasses-type terminal may set an operation mode by its setting. For example, the glasses-type terminal may operate in a first mode capable of transmitting and receiving specific information to and from any one external device or a second mode capable of transmitting and receiving specific information simultaneously with each of a plurality of external devices, by its setting.

When the second mode is set by the user's selection, the controller 280 may control the wireless communication unit to connect with a plurality of external devices included within a preset distance from the glasses-type terminal 200. Here, identification information corresponding to each of the plurality of external devices may be registered in advance in the glasses-type terminal.

In this manner, the controller 280 may control the camera 221 to capture an external environment, and control the sensing unit to sense the user's gaze on the external environment.

As illustrated in the second drawing of FIG. 9A, when the user's gaze to any one external device 500 (electronic board) in the external environment is sensed, the controller 280 may specify an object to which the user's gaze is directed from a captured image corresponding to the external environment captured from the camera 221.

Furthermore, the controller 280 may acquire screen information 30 displayed on the display unit of the external device 500 through an image analysis of the external device 500 corresponding to the specified object. For example, the controller 280 may obtain identification information corresponding to the external device 500, and receive the screen information 30 from the external device 500. For another example, the controller 280 may acquire a captured image of the screen information 30 using the camera 221.

In addition, as illustrated in the third drawing of FIG. 9A, when a preset movement (an operation of moving his or her hand to any one direction) is sensed by the sensing unit while the user's eyes are directed to the external device 500, the controller 280 may transmit the screen information 30 to a plurality of external devices.

In other words, the screen information 30 may be transmitted to a plurality of external devices 100, 100' previously registered in the glasses-type terminal 200, as illustrated in the fourth drawing of FIG. 9A.

Similarly, referring to FIG. 9B, the user's terminal 300 may be specified to any one external device to which the user's gaze is directed. In this case, as illustrated in the second drawing of FIG. 9B, when the user's preset gesture is sensed, the controller 280 may transmit information 28 displayed on the display unit 351 of the user terminal 300 to the plurality of external devices 100, 100'.

Moreover, the controller 280 may control the plurality of external devices 100, 100' to display additional information formed by the user on the screen information 28 transmitted to each of the plurality of external devices 100, 100'. Here, the additional information formed by the user may be information corresponding to highlighted content based on the user's gaze, voice, or the like, among contents included in the screen information 28.

In other words, as illustrated in the third drawing of FIG. 9B, the controller 280 may transmit information included in a region 28a specified by the user's gaze on the screen information 28 as the additional information to the plurality of external devices 100, 100'. In this case, the additional information may be highlighted and displayed (28a) on the screen information (28) displayed on the display unit of each of the plurality of external devices 100, 100'.

Although not shown in the drawing, when the user's voice is entered in a state where the screen information 28 is displayed, the controller 280 may transmit at least part thereof corresponding to the user's voice on the screen information 28 as the additional information to the plurality of external devices 100, 100'.

In this manner, the controller 280 may simultaneously transmit information to a plurality of external devices included within a preset distance from the glasses-type terminal based on the user's gaze or preset movement. In addition, additional information highlighted by the user among the information transmitted to the plurality of external devices may be transmitted at the same time to provide convenience to the user corresponding to each of the plurality of external devices.

Similarly, when operating in the second mode, the glasses-type terminal may receive information from each of a plurality of external devices connected in a wireless manner. Regarding this, it will be described with reference to FIG. 10.

Figure 10:
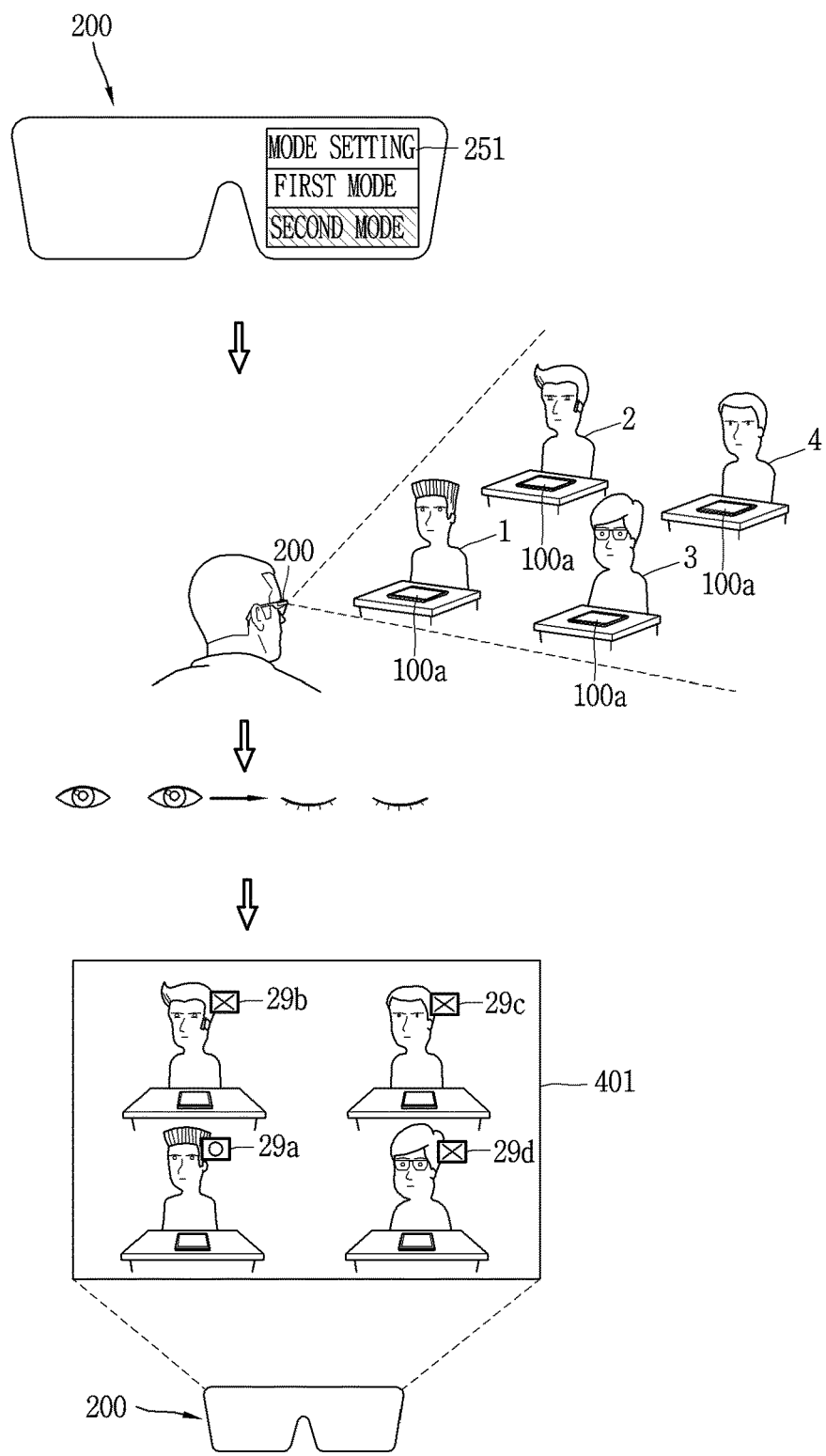
FIG. 10 is a view illustrating an embodiment in which a glasses-type terminal receives information from a plurality of external devices at the same time.

FIG. 10 is a view illustrating an embodiment in which a glasses-type terminal receives information from a plurality of external devices at the same time.

In a state where the second mode is set in the glasses-type terminal 200, the user's gaze toward the external environment may be sensed, and the user's preset gesture (a gesture of blinking both eyes) may be sensed.

In this case, the controller 280 may receive information displayed on the display unit of each of the plurality of external devices 100a, 100b, 100c, 100d at once using the wireless communication unit. Furthermore, the controller 280 may control the display unit 251 to display summary information on the information received from each of the plurality of external devices 100a, 100b, 100c, 100d in a region adjacent to an object that corresponds to each of the plurality of external devices 100a, 100b, 100c, 100d.

For example, the information received from each of the plurality of external devices 100a, 100b, 100c, 100d may be information entered by the user, which corresponds to each of the plurality of external devices 100a, 100b, 100c, 100d (for a more specific example, information on a math solution to problem). In this case, the controller 280 may analyze the information received from each of the plurality of external devices 100a, 100b, 100c, 100d to determine summary information of each information (in case of solution to problem information, information indicating whether or not the solution to problem is correct).

Therefore, as illustrated in the fourth drawing of FIG. FIG. 10, the summary information 29a, 29b, 29c, 29d may be respectively located in a region corresponding to a region in which an object corresponding to each of the plurality of external devices 100a, 100b, 100c, 100d is located.

As described above, any one external device or a plurality of external devices may be controlled according to a mode set in the glasses-type terminal. In addition, a user wearing the glasses-type terminal may easily control the any one external devices or the plurality of external devices with a simple gesture of changing his or her gaze or operation.

The glasses-type terminal according to the present disclosure may sense a specific movement of an object other than the one object in a field of view range of the camera 221 while sensing that the user's gaze is directed to any one object. Hereinafter, an embodiment related thereto will be described with reference to FIG. 11.

Figure 11:
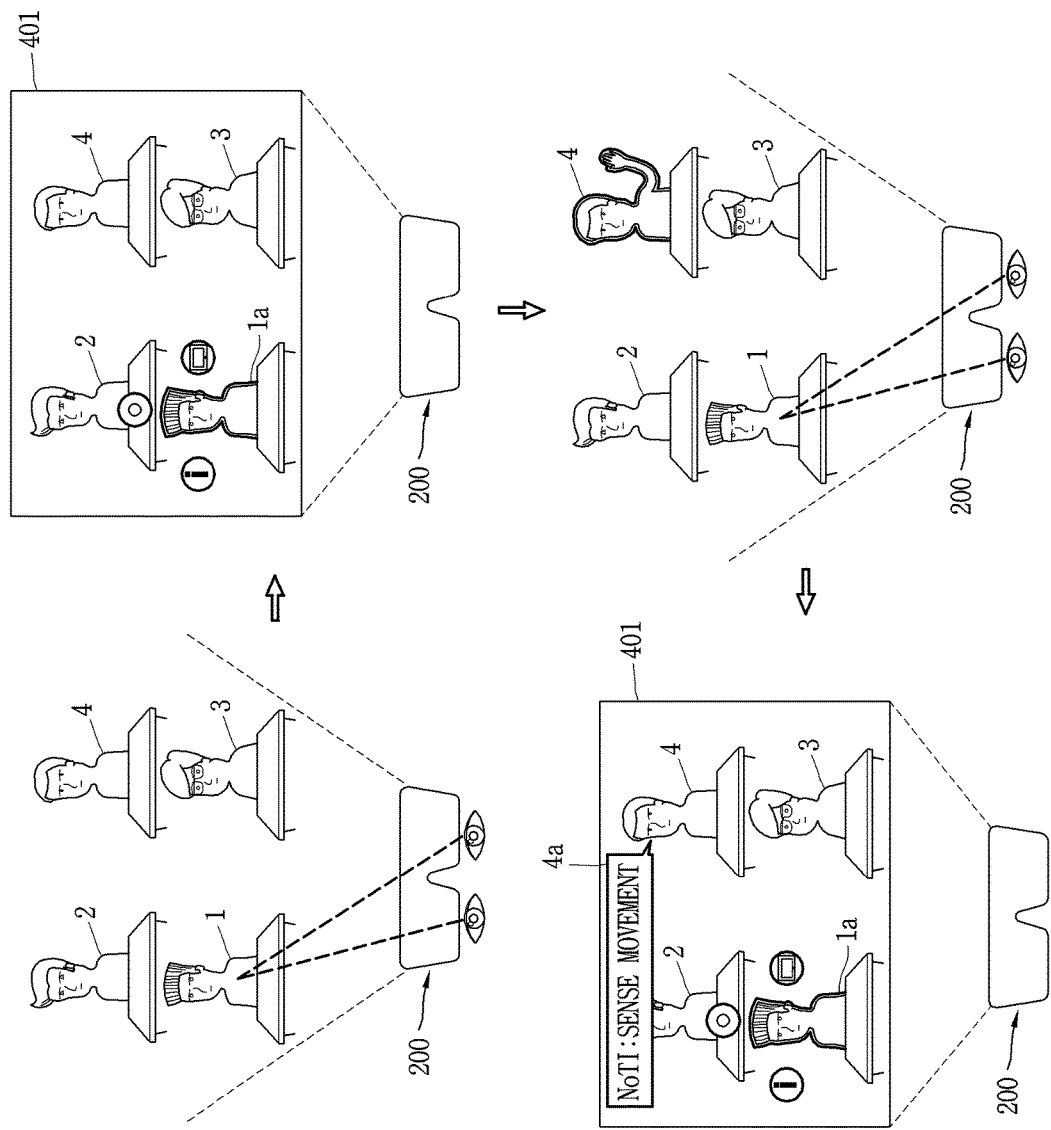
FIG. 11 is a view illustrating an embodiment of providing a notification for an object other than an object specified based on the user's gaze within a field of view range of a camera.

FIG. 11 is a view illustrating an embodiment of providing a notification for an object other than an object specified based on the user's gaze within a field of view range of a camera.

Referring to FIG. 11, when it is sensed that the user's gaze is detected to any one object 1 of the external environment, the controller 280 may display a function icon in a corresponding region that corresponds to a region in which the any one object 1 is located.

In this state, as illustrated in the third drawing of FIG. 11, a specific movement of an object 4 other than the one object 1 to which the user's gaze is directed may be sensed by the camera 221. For example, the other object 4 may be moved by a specific operation such as raising a hand, rising from a seat, or the like.

In this case, as illustrated in the fourth drawing of FIG. 11, the controller 280 may control the display unit 251 to display a notification 4a indicating the specific movement in one region related to a region in which the other object 4 is located. Therefore, the user may easily find a movement related to the other object 4 which is not sensed even when the gaze is fixed to any one object 1.

The glasses-type terminal according to an embodiment of the present disclosure may specify any one object in an external environment through the analysis of a user's gaze and provide an icon of a function that can be executed in association with the specified object. Accordingly, the user may intuitively receive information on executable functions associated with the specified object without directly searching for information associated with the specified object.

In addition, the user is provided with the convenience of performing various functions associated with the function icon using a non-contact input such as a change of gaze or a preset gesture.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A wearable glasses-type terminal, the glasses-type terminal comprising:
    a display unit provided on a main body of the glasses-type terminal;
    a camera configured to capture an external environment;
    a sensing unit configured to sense a user's gaze on the external environment; and
    a controller configured to analyze the user's gaze on the external environment to specify an object to which the user's gaze is directed from an image corresponding to the external environment captured by the camera, and control the display unit to locate a function icon linked to a preset function in a corresponding region that corresponds to a region in which the specified object is located based on an event associated with the specified object being captured through the camera,
    wherein the event associated with the specified object is a preset movement of the specified object captured through the camera.

2. The glasses-type terminal of claim 1, wherein the controller executes a function linked to the function icon based on receiving a selection input associated with the function icon.

3. The glasses-type terminal of claim 2, wherein the selection input associated with the function icon is received by sensing the user's preset gesture in a state where the user's gaze toward the function icon is sensed by the sensing unit.

4. The glasses-type terminal of claim 2, further comprising:
    a wireless communication unit,
    wherein the function icon comprises a control icon linked to a function of controlling an external device corresponding to the specified object, and
    the controller controls the wireless communication to transmit a preset control command to an external device when a function of controlling the external device corresponding to the specified object is carried out.

5. The glasses-type terminal of claim 4, wherein the controller analyzes an image of the specified object included in an image corresponding to the external environment to acquire the identification information of the external device corresponding to the specified object, and controls the wireless communication unit to perform wireless communication with the external device using the identification information of the external device.

6. The glasses-type terminal of claim 2, wherein the function icon comprises an information icon linked to a function of checking information associated with the specified object, and
the controller analyzes an image of the specified object included in an image corresponding to the external environment to acquire information associated with the specified object, and controls the display unit to display at least part of the acquired information associated with the specified object when the function of checking information associated with the specified object is carried out.

7. The glasses-type terminal of claim 6, wherein the controller adjusts an output amount of information associated with the specified object according to a number of objects included in an image corresponding to the external environment.

8. The glasses-type terminal of claim 2, wherein the function icon comprises a data formation icon linked to a function of forming image data for the specified object, and
the controller controls the camera to capture the specified object when a selection input associated with the data formation icon is received, and controls the display unit to display a preview image for the specified object captured by the camera.

9. The glasses-type terminal of claim 8, wherein when a specific input is applied to the glasses-type terminal in a state where the preview image is displayed on the display unit,
the controller searches for associated data image including movement information associated with the movement of the specified object included in the preview image and controls the display unit to display the associated data image to overlap with the preview image to compare the associated data image with the preview image.

10. The glasses-type terminal of claim 1, wherein when a specific movement of an object other than the specified object to which the user's gaze is directed is sensed by the camera, the controller controls the display unit to display information indicating the specific movement of the other object in one region related to a region in which the other object is located.

11. A method of controlling a glasses-type terminal, the method comprising:
capturing an external environment by a camera;
sensing a user's gaze on the external environment by a sensing unit;
analyzing the user's gaze on the external environment to specify an object to which the user's gaze is directed from an image corresponding to the external environment; and
locating a function icon linked to a preset function in a corresponding region that corresponds to a region in which the specified object is located based on an event associated with the specified object being captured through the camera,
wherein the event associated with the specified object is a preset movement of the specified object captured through the camera.

12. The method of claim 11, further comprising:
receiving a selection input associated with the function icon; and
executing a function linked to the function icon based on receiving the selection input associated with the function icon.

13. The method of claim 12, wherein the selection input associated with the function icon is received by sensing the user's preset gesture in a state where the user's gaze toward the function icon is sensed by the sensing unit.

* * * * *